United States Patent
Choi et al.

(10) Patent No.: US 9,723,321 B2
(45) Date of Patent: Aug. 1, 2017

(54) METHOD AND APPARATUS FOR CODING VIDEO STREAM ACCORDING TO INTER-LAYER PREDICTION OF MULTI-VIEW VIDEO, AND METHOD AND APPARATUS FOR DECODING VIDEO STREAM ACCORDING TO INTER-LAYER PREDICTION OF MULTI VIEW VIDEO

(71) Applicant: SAMSUNG ELECTRONICS CO., LTD., Suwon-si (KR)

(72) Inventors: Byeong-doo Choi, Siheung-si (KR); Jeong-hoon Park, Seoul (KR); Chan-yul Kim, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 286 days.

(21) Appl. No.: 14/434,345

(22) PCT Filed: Oct. 8, 2013

(86) PCT No.: PCT/KR2013/008987
§ 371 (c)(1),
(2) Date: Apr. 8, 2015

(87) PCT Pub. No.: WO2014/058210
PCT Pub. Date: Apr. 17, 2014

(65) Prior Publication Data
US 2015/0264384 A1 Sep. 17, 2015

Related U.S. Application Data

(60) Provisional application No. 61/710,876, filed on Oct. 8, 2012.

(51) Int. Cl.
*H04N 19/513* (2014.01)
*H04N 19/597* (2014.01)
(Continued)

(52) U.S. Cl.
CPC ......... *H04N 19/513* (2014.11); *H04N 19/172* (2014.11); *H04N 19/187* (2014.11);
(Continued)

(58) Field of Classification Search
CPC .. H04N 19/513; H04N 19/188; H04N 19/172; H04N 19/187; H04N 19/46;
(Continued)

(56) References Cited

U.S. PATENT DOCUMENTS 8,428,144 B2  4/2013  Park et al.
8,923,399 B2  12/2014  Yang
(Continued)

FOREIGN PATENT DOCUMENTS

KR  10-2008-0002943 A  1/2008
KR  10-0900294 B1  5/2009
(Continued)

OTHER PUBLICATIONS

Search Report dated Jan. 23, 2014, issued by the International Searching Authority in counterpart International Application No. PCT/KR2013/008987.
(Continued)

*Primary Examiner* — Sath V Perungavoor
*Assistant Examiner* — Howard D Brown, Jr.
(74) *Attorney, Agent, or Firm* — Sughrue Mion, PLLC

(57) ABSTRACT

A decoding method includes obtaining random access point (RAP) reference layer number information indicating a number of layers referred to for performing inter layer prediction on RAP images among current layer images and non-RAP reference layer number information indicating a number of different layers referred to for performing inter layer prediction on non-RAP images, from a video stream including images encoded for a plurality of layers, obtaining RAP reference layer identification information for a layer
(Continued)

referred to for predicting the RAP images based on the obtained RAP reference layer number information, from the video stream, obtaining non-RAP reference layer identification information for a layer referred to for predicting the non-RAP images based on the obtained non-RAP reference layer number information, and reconstructing a RAP image and a non-RAP image based on layer images indicated by the obtained RAP reference layer identification information and the obtained non-RAP reference layer identification information.

15 Claims, 28 Drawing Sheets

(51) Int. Cl.
  *H04N 19/503* (2014.01)
  *H04N 19/70* (2014.01)
  *H04N 19/46* (2014.01)
  *H04N 19/172* (2014.01)
  *H04N 19/187* (2014.01)
  *H04N 19/169* (2014.01)
  *H04N 7/32* (2006.01)

(52) U.S. Cl.
  CPC ........... *H04N 19/188* (2014.11); *H04N 19/46* (2014.11); *H04N 19/503* (2014.11); *H04N 19/597* (2014.11); *H04N 19/70* (2014.11)

(58) Field of Classification Search
  CPC .... H04N 19/70; H04N 19/503; H04N 19/597; H04N 19/0003; H04N 19/105; H04N 19/593; H04N 19/159; H04N 19/30; H04N 19/156
  See application file for complete search history.

(56) References Cited

U.S. PATENT DOCUMENTS

| 8,933,989 B2 | 1/2015 | Lim et al. |
| 9,351,009 B2* | 5/2016 | Deshpande .......... H04N 19/503 |
| 2006/0233242 A1 | 10/2006 | Wang et al. |
| 2012/0056981 A1* | 3/2012 | Tian ..................... H04N 19/597 348/42 |
| 2014/0092964 A1* | 4/2014 | Ugur ..................... H04N 19/46 375/240.12 |
| 2015/0124864 A1* | 5/2015 | Kim ....................... H04N 19/70 375/240.02 |

FOREIGN PATENT DOCUMENTS

| KR | 10-2009-0099588 A | 9/2009 |
| KR | 10-2011-0139304 A | 12/2011 |

OTHER PUBLICATIONS

Written Opinion dated Jan. 23, 2014, issued by the International Searching Authority in counterpart International Application No. PCT/KR2013/008987.

* cited by examiner

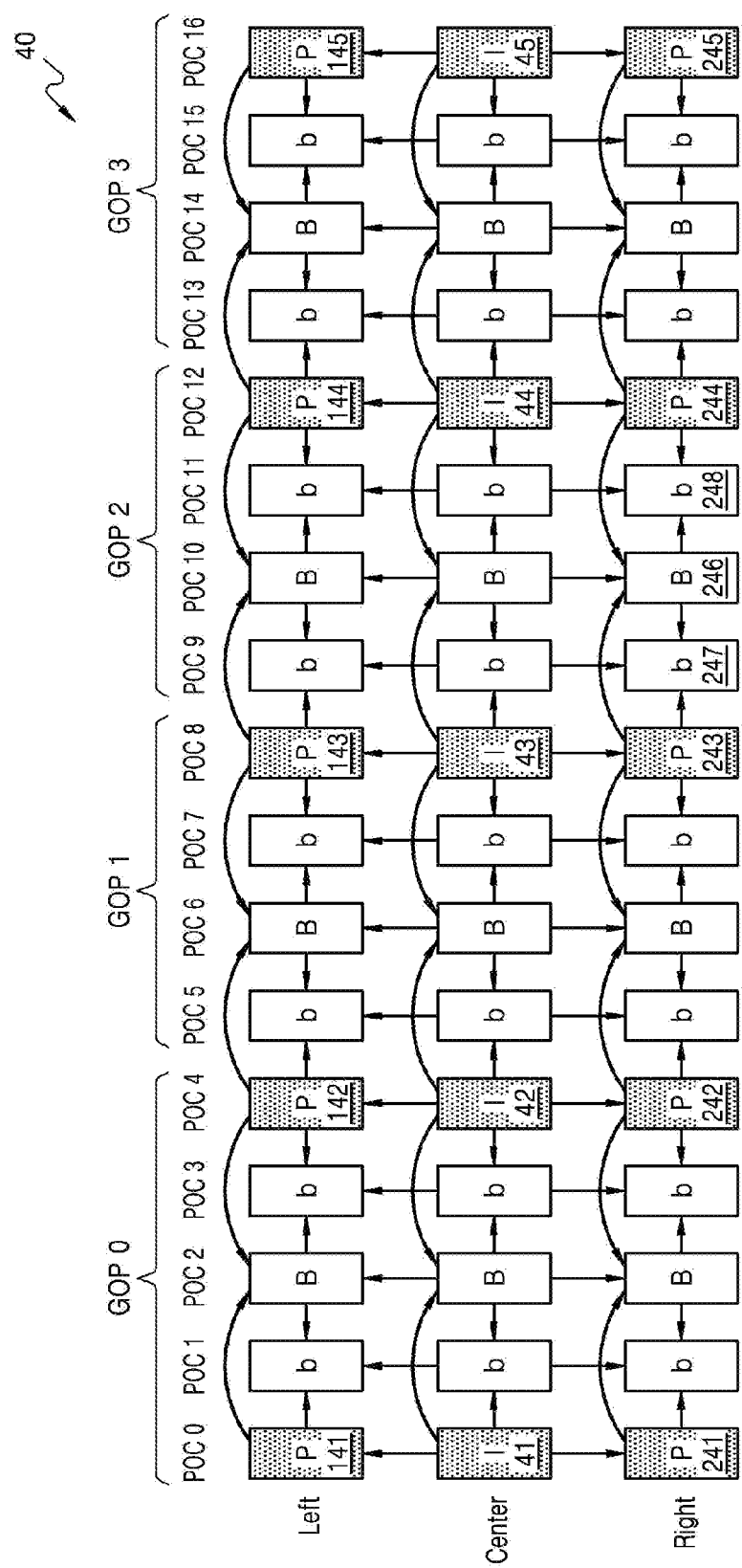

FIG. 7B

```
60 — vps_extension( ) {
          ...
   61 ── for( i = 0; i <= vps_max_layers_minus1; i++ ) {
              view_id[ i ]
62 —          if (i>0) {
63 —              num_direct_ref_layers_rap[ i ]
64 —              num_direct_ref_layers_non_rap[ i ]
              }
              for( j = 0; j < num_direct_ref_layers_rap[ i ] && i; j++ )
65 —              ref_layer_id_rap[ i ][ j ]
              for( j = 0; j < num_direct_ref_layers_nonrap[ i ] && i; j++ )
66 —              ref_layer_id_non_rap[ i ][ j ]
          }
          ...
      }
```

FIG. 7C

```
67 — vps_extension( ) {
          while( !byte_aligned( ) )
              vps_extension_byte_alignment_reserved_zero_bit
68 —      multi_standard_flag
          If(multi_standard_flag)
69 —          profile_level_for_nonHEVC()
```

CODING UNIT (1010)

PREDICTION UNIT (1060)

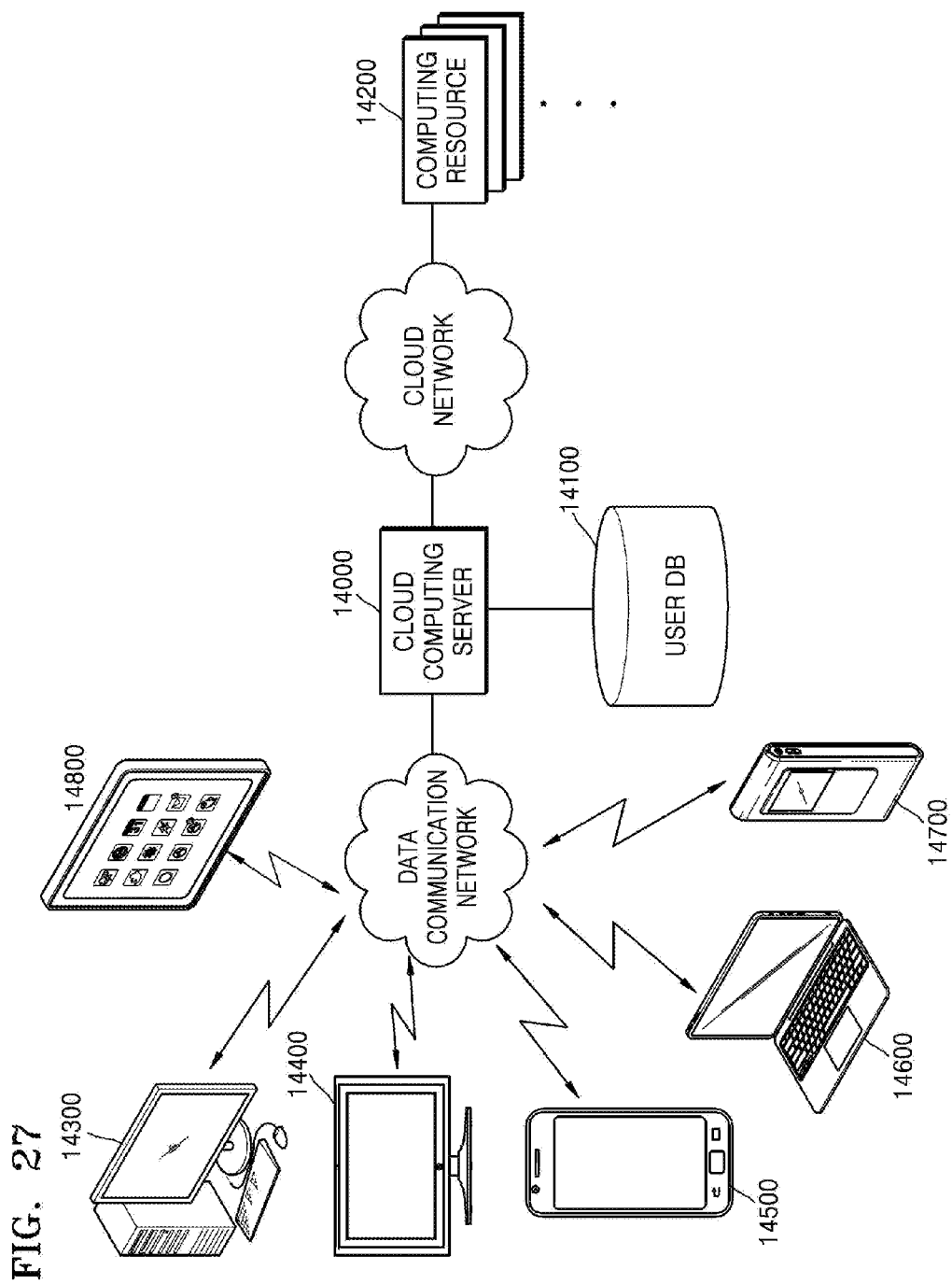

US 9,723,321 B2

METHOD AND APPARATUS FOR CODING VIDEO STREAM ACCORDING TO INTER-LAYER PREDICTION OF MULTI-VIEW VIDEO, AND METHOD AND APPARATUS FOR DECODING VIDEO STREAM ACCORDING TO INTER-LAYER PREDICTION OF MULTI VIEW VIDEO

CROSS-REFERENCE TO RELATED APPLICATIONS

This application is a National Stage Entry of PCT/KR2013/008987, filed on Oct. 8, 2013, which claims priority to U.S. provisional patent application No. 61/710,876, filed on Oct. 8, 2012, in the U.S. Patent and Trademark Office, the entire disclosures of which are incorporated herein by reference in their entirety.

TECHNICAL FIELD

Exemplary embodiments relate to methods and apparatuses for encoding and decoding a video that encode an image sequence for at least one layer and decode a received video stream for at least one layer.

BACKGROUND OF THE RELATED ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial region is transformed into coefficients of a frequency region via frequency transformation. According to a video codec, an image is split into blocks having a predetermined size, discrete cosine transformation (DCT) is performed for each respective block, and frequency coefficients are encoded in block units, for rapid calculation for frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

According to a multi-layer video codec, a base layer video and one or more enhancement layer videos are encoded and decoded. By removing temporal or spatial redundancy between the base layer video and the enhancement layer videos and redundancy between layers, an amount of data of the base layer video and the enhancement layer videos can be reduced.

SUMMARY

The exemplary embodiments provide a method of encoding a video stream or a method of decoding a video stream, which encodes an image sequence for each view for each of a plurality of layers according to an inter-view prediction structure and signals inter-view prediction related information for decoding entire layers.

The exemplary embodiments also provide a method of encoding a video stream or a method of decoding a video stream, which signals information indicating whether to decode the video stream according to different video standard methods for each layer.

According to an aspect of an exemplary embodiment, there is provided a video stream decoding method including obtaining random access point (RAP) reference layer number information indicating a number of layers referred to for performing inter layer prediction on RAP images among current layer images and non-RAP reference layer number information indicating a number of different layers referred to for performing inter layer prediction on non-RAP images, from a video stream comprising images encoded for a plurality of layers, obtaining RAP reference layer identification information for a layer referred to for predicting the RAP images based on the obtained RAP reference layer number information, from the video stream, obtaining non-RAP reference layer identification information for a layer referred to for predicting the non-RAP images based on the obtained non-RAP reference layer number information, from the video stream, reconstructing a RAP image of a current layer based on a layer image indicated by the obtained RAP reference layer identification information, and reconstructing a non-RAP image of the current layer based on a layer image indicated by the obtained non-RAP reference layer identification information.

When the current layer is a base layer, the RAP reference layer number information, the non-RAP reference layer number information, the RAP reference layer identification information, and the non-RAP reference layer identification information may be obtained from the video stream for the plurality of layers.

The RAP image may be one of a clean random access (CRA) image, a broken link access (BLA) image, and an instantaneous decoding refresh (IDR) image.

The video stream decoding method may further include obtaining multiple standard use information indicating whether two or more encoding standard methods are used for the plurality of layers, from the video stream.

The obtaining of the multiple standard use information may include, when the plurality of layers respectively correspond to views of a multi-view video, obtaining information regarding a profile and a level of a predetermined standard method that is an encoding method of images of a predetermined layer from among a base view layer and additional view layers of the multi-view video, and reconstructing the images of the predetermined layer based on the obtained information regarding the profile and the level of the predetermined standard method.

The RAP reference layer number information, the non-RAP reference layer number information, the RAP reference layer identification information, and the non-RAP reference layer identification information may be obtained from a video parameter set (VPS) extension area included in a raw bytes sequence payload (RBSP) of high efficiency video coding (HEVC) network abstract layer (NAL) units, from the video stream including the HEVC NAL units.

According to another aspect of an exemplary embodiment, there is provided a video stream encoding method including encoding random access point (RAP) images from among current layer images by referring to a different layer image for a plurality of layers, encoding non-RAP images from among the current layer images by referring to a different layer image for the plurality of layers, and generating a bitstream including RAP reference layer number information indicating a number of layers referred to for performing inter layer prediction on the RAP images, non-RAP reference layer number information indicating a number of different layers referred to for performing inter layer prediction on the non-RAP images, RAP reference layer identification information for a layer referred to for predicting the RAP images, and non-RAP reference layer identification information for a layer referred to for predicting the non-RAP images, for the plurality of layers. When the current layer is a base layer, the RAP reference layer number information, the non-RAP reference layer number information, the RAP reference layer identification information, and the non-RAP reference layer identification information may be obtained from a video stream for the plurality of layers. The RAP image may be one of a clean random access (CRA) image, a broken link access (BLA) image, and an instantaneous decoding refresh (IDR) image. The generating of the bitstream may include including multiple standard use information indicating whether two or more encoding standard methods are used for the plurality of layers in the bitstream.

When the plurality of layers respectively correspond to views of a multi-view video, the multiple standard use information may include information regarding a profile and a level of a predetermined standardized encoding method that is an encoding method of images of a predetermined layer among a base view layer and additional view layers of the multi-view video, based on the multiple standard use information, and the images of the predetermined layer may be encoded based on the information regarding the profile and the level of the predetermined standard method.

The generating of the bitstream may include recording the RAP reference layer number information, the non-RAP reference layer number information, the RAP reference layer identification information, and the non-RAP reference layer identification information in a video parameter set (VPS) extension area included in a raw bytes sequence payload (RBSP) of high efficiency video coding (HEVC) network abstract layer (NAL) units.

According to another aspect of an exemplary embodiment, there is provided a video stream decoding apparatus including a bitstream parser configured to obtain random access point (RAP) reference layer number information indicating a number of layers referred to for performing inter layer prediction on RAP images among current layer images and non-RAP reference layer number information indicating a number of different layers referred to for performing inter layer prediction on non-RAP images, RAP reference layer identification information for a layer referred to for predicting the RAP images based on the obtained RAP reference layer number information, and non-RAP reference layer identification information for a layer referred to for predicting the non-RAP images based on the obtained non-RAP reference layer number information, from a video stream comprising images encoded for a plurality of layers, and an inter layer decoder configured to reconstruct a RAP image of a current layer based on a layer image indicated by the obtained RAP reference layer identification information, and reconstruct a non-RAP image of the current layer based on a layer image indicated by the obtained non-RAP reference layer identification information.

According to another aspect of an exemplary embodiment, there is provided a video stream encoding apparatus comprising a base view image restorer configured to restore base view images comprising base view anchor pictures that are I-picture type images by performing motion compensation referring to the base view images by using a received base view image stream, a first additional view image restorer configured to restore images of a first additional view by performing at least one of disparity compensation referring to the restored base view images and motion compensation referring to images except for an anchor picture having a preceding reproduction order among the images of the first additional view by using an image stream of the first additional view from among received additional view image streams, and a view switcher configured to, if view switching occurs during restoration of the images of the first additional view, restore images of a second additional view by performing at least one of disparity compensation referring to the restored base view images and motion compensation referring to images except for an anchor picture having a preceding reproduction order among the images of the second additional view based on an anchor picture of the second additional view of a view switching point by using an image stream of the second additional view.

According to another aspect of an exemplary embodiment, there is provided a non-transitory computer readable recording medium having recorded thereon a program for executing the methods according to exemplary embodiments.

A multi-view video prediction apparatus according to an exemplary embodiment generates an additional view image stream according to a prediction structure for inter prediction in order to prevent an anchor picture of a second additional view restored immediately before a current image is encoded from being referred to, thereby enabling inter prediction even though there is no anchor picture right before views are switched.

A multi-view video prediction restoring apparatus according to an exemplary embodiment does not need to refer to an anchor picture of a second additional view restored immediately before a current image is decoded although views are switched to the second additional view during restoration of images of a first additional view, thereby obtaining all reference images for motion compensation and restoring images of the second additional view without any decoding error or image loss.

BRIEF DESCRIPTION OF THE DRAWINGS

FIGS. 5A, 5B, 5C and 5D are diagrams of reproduction orders and coding orders of an inter layer prediction structure of a multi-view video, respectively, according to an exemplary embodiment;

FIGS. 7B and 7C are diagrams of a syntax of a video parameter set (VPS) extension according to an exemplary embodiment;

FIG. 27 illustrates a network structure of a cloud computing system using a video encoding apparatus and a video decoding apparatus, according to an exemplary embodiment.

DETAILED DESCRIPTION OF EXEMPLARY EMBODIMENTS

Hereinafter, a video stream encoding apparatus, a video stream decoding apparatus, a video stream encoding method, and a video stream decoding method according to various exemplary embodiments will be described with reference to FIGS. 1A through 7C. A video encoding apparatus, a video decoding apparatus, a video encoding method, and a video decoding method, configured to perform encoding and decoding operations based on coding units having a tree structure according to various exemplary embodiments, will be described with reference to FIGS. 8 through 20. In addition, various exemplary embodiments to which the video stream encoding method, the video stream decoding method, the video encoding method, and the video decoding method according to exemplary embodiments of FIGS. 1A through 20 are applied will be described with reference to FIGS. 21 through 27. Hereinafter, the term 'image' may refer to a still image or a moving picture, that is, a video itself.

First, with reference to FIGS. 1A through 7C, the video stream encoding apparatus, the video stream decoding apparatus, the video stream encoding method, and the video stream decoding method according to various exemplary embodiments will now be described.

Figure 1A:
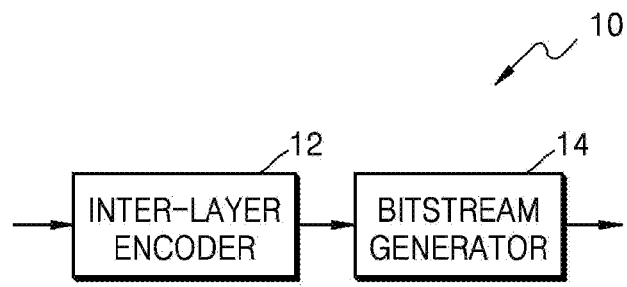
FIG. 1A is a block diagram of a video stream encoding apparatus according to an exemplary embodiment.
Figure 1B:
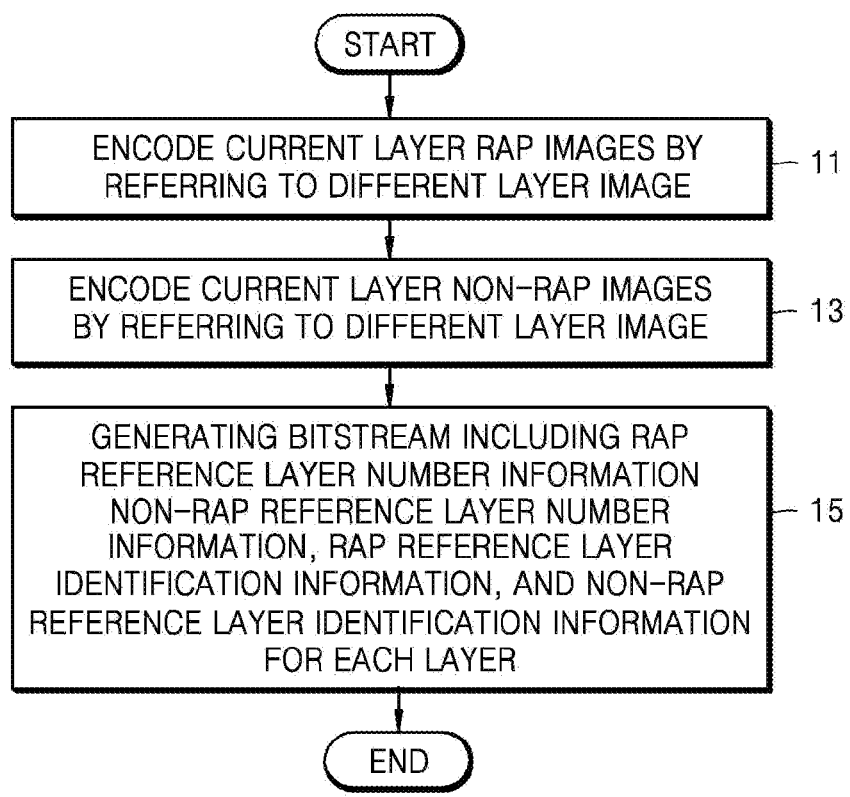
FIG. 1B is a flowchart of a video stream encoding method according to an exemplary embodiment.

FIG. 1A is a block diagram of a video stream encoding apparatus 10 according to an exemplary embodiment. FIG. 1B is a flowchart of a video stream encoding method according to an exemplary embodiment.

The video stream encoding apparatus 10 according to an exemplary embodiment includes an inter layer encoder 12 and a bitstream generator 14.

The video stream encoding apparatus 10 according to an exemplary embodiment may classify and encode a plurality of video streams for each layer according to scalable video coding. The video stream encoding apparatus 10 may encode base layer images and enhancement layer images according to different layers.

For example, a multi-view video may be encoded according to scalable video coding. Left view images may be encoded as base layer images. Right view images may be encoded as enhancement layer images. Alternatively, center view images, the left view images, and the right view images may be encoded, in which the center view images may be encoded as base layer images, the left view images may be encoded as first enhancement layer images, and the right view images may be encoded as second enhancement layer images. An encoding result of the base layer images may be output in a base layer stream, and an encoding result of the first enhancement layer images and the second enhancement layer images may be output in a first enhancement layer stream and a second enhancement layer stream, respectively.

In the presence of three or more enhancement layers, base layer images, first enhancement layer images, second enhancement layer images, through $K_{th}$ enhancement layer images may be encoded. Thus, an encoding result of the base layer images may be output in the base layer stream and an encoding result of the first, second, through $K_{th}$ enhancement layer images may be output in first, second, through $K_{th}$ enhancement layer streams, respectively.

The video stream encoding apparatus 10 according to an exemplary embodiment may perform inter prediction for predicting a current image by referring to images of a same layer. Through inter prediction, a motion vector indicating motion information between the current image and a reference image, and a residual between the current image and the reference image, may be generated.

The video stream encoding apparatus 10 according to an exemplary embodiment may perform inter-layer prediction for predicting enhancement layer images by referring to the base layer images. The video stream encoding apparatus 10 may perform inter-layer prediction for predicting second enhancement layer images by referring to the first enhancement layer images. Through inter-layer prediction, a position differential component between the current image and a reference image of a different layer, and a residual between the current image and the reference image of the different layer, may be generated.

When the video stream encoding apparatus 10 according to an exemplary embodiment allows two or more enhancement layers, the video stream encoding apparatus 10 may perform inter-layer prediction between one base layer image and two or more enhancement layer images according to a multi-layer prediction structure.

The inter-layer prediction structure will be described in more detail with reference to FIG. 3 later.

The video stream encoding apparatus 10 according to an exemplary embodiment encodes each video image for each respective block according to each layer. A block may have a square shape, a rectangular shape, or any geometric shape and is not limited to a data unit having a predetermined size. According to an exemplary embodiment, a block may be a maximum coding unit, a coding unit, a prediction unit, a transformation unit, or the like from among coding units according to a tree structure. For example, the video stream encoding apparatus 10 may split and encode images according to an HEVC standard into blocks having a quadtree structure for each layer. Video encoding and decoding methods based on coding units according to a tree structure will be described below with reference to FIGS. 8 through 20. Inter prediction and inter layer prediction may be performed based on a data unit of the coding unit, the prediction unit, or the transformation unit.

The inter-layer encoder 12 according to an exemplary embodiment may encode an image sequence for at least one layer. The inter-layer encoder 12 may perform source coding operations including inter prediction or intra prediction for each layer to generate symbol data. For example, the inter-layer encoder 12 may perform transformation and quantization on an image block recording data obtained by performing inter prediction or intra prediction on image samples, generate symbol data, perform entropy encoding on the symbol data, and generate a bitstream.

The inter-layer encoder 12 may encode the image sequence for each layer to generate each bitstream. As described above, the inter-layer encoder 12 may encode a current layer image sequence with reference to symbol data of a different layer through inter-layer prediction. Thus, the inter-layer encoder 12 according to an exemplary embodiment may refer to an image sequence of a different layer or an image sequence of a same layer according to a prediction mode to encode the image sequence of each layer. For example, the inter-layer encoder 12 may predict a current sample by using peripheral samples within a current image in an intra mode, and may predict the current image by using another image of the same layer in an inter mode. The inter-layer encoder 12 may predict the current image by using a reference image of the same picture order count (POC) as that of the current image from among different layer images.

The inter-layer encoder 12 may encode a multi-view video and encode an image of a different view for each layer. A current view image is encoded by using a different view image in an inter-layer prediction structure with respect to the multi-view video, which is referred to as an inter-view prediction structure.

The inter-layer encoder 12 according to an exemplary embodiment may encode base layer random access point (RAP) images that are an I-picture type among base layer images by not referring to a different image. The base layer RAP images that are the I-picture type may be one of randomly accessible clean random access (CRA) images, broken link access (BLA) images, instantaneous decoding refresh (IDR) images, etc.

An RAP image according to an exemplary embodiment does not refer to another image from among an image sequence of a same stream, and thus instantaneous decoding and reproduction may be possible with respect to the RAP image without a reconstructed image. The RAP image in a multi-view video may transform a reproduction view such that while one enhancement layer image is being decoded and reproduced between a plurality of additional views, other enhancement layer images may be decoded and reproduced by transforming the reproduction view.

The inter-layer encoder 12 according to an exemplary embodiment may generate a residual through inter-prediction of base layer images excluding a base layer RAP image. Intra prediction for referring to peripheral pixels within an image may be performed on base layer RAP images.

The inter-layer encoder 12 according to an exemplary embodiment may encode non-RAP images from among base layer images with reference to other images of a same layer.

The inter-layer encoder 12 according to an exemplary embodiment may perform encoding on resultant data generated by performing inter prediction or intra prediction on base layer images to generate encoding data. For example, transformation, quantization, entropy encoding, etc., may be performed on an image block recording resultant data generated by performing inter prediction, intra prediction, or inter layer prediction.

The inter-layer encoder 12 according to an exemplary embodiment may generate a base layer bitstream including encoding data of the base layer RAP image and encoding data of base view non-RAP images. The inter-layer encoder 12 may output motion vectors generated through inter prediction between base layer images along with the base layer bitstream.

The inter-layer encoder 12 according to an exemplary embodiment may encode enhancement layer images to generate an enhancement layer bitstream. When encoding a plurality of enhancement layer images, the inter-layer encoder 12 according to an exemplary embodiment may encode the enhancement layer images for each enhancement layer to generate respective bitstreams. For convenience of description, an encoding operation of the inter-layer encoder 12 according to an exemplary embodiment on an enhancement layer may also be referred to as an operation on enhancement layer images of one layer. However, the operation of the inter-layer encoder 12 is not performed on only enhancement layer images of one layer but may be applied to each of enhancement layer images of different layers.

The inter-layer encoder 12 according to an exemplary embodiment may perform inter layer prediction for referring to different layer images and inter prediction for predicting same layer images to encode an enhancement layer image.

The inter-layer encoder 12 may perform inter layer prediction on enhancement layer RAP images. The inter-layer encoder 12 may perform at least one of inter layer prediction and inter prediction on enhancement layer non-RAP images.

The inter-layer encoder 12 according to an exemplary embodiment may generate an enhancement layer bitstream including encoding data of an enhancement layer RAP image and encoding data of enhancement layer non-RAP images. The inter-layer encoder 12 may output motion vectors generated through inter prediction between enhancement layer images and disparity vectors generated through inter layer prediction along with an enhancement layer bitstream.

There may be a difference between an RAP image and a non-RAP image regarding whether to refer to a firstly reconstructed image. Thus, reference layers used to predict each of the RAP image and the non-RAP image may be different.

Hereinafter, detailed operations of determining a parameter related to a reference layer for inter layer prediction between an RAP image and a non-RAP image performed by the video stream encoding apparatus 10 will be described in detail with reference to FIG. 1B.

The inter-layer encoder 12 may perform inter-layer prediction on RAP images and non-RAP images for each of a plurality of layers.

In operations S11 and S13, the video stream encoding apparatus 10 may perform inter-layer prediction on an improvement layer, other than a base layer, for each layer.

In operation S11, the inter-layer encoder 12 may encode RAP images among current layer images with reference to at least one different layer image for each layer. In operation S13, the inter-layer encoder 12 may encode non-RAP images among the current layer images with reference to at least one different layer image.

In operation S15, the bitstream generator 14 may generate a bitstream including encoding data generated by performing encoding for each layer in operations S11 and S13. The bitstream generator 14 may generate a bitstream for each layer, multiplex the bitstream, and generate one video stream.

The bitstream generated by the bitstream generator 14 may include a video parameter set (VPS) area recording base information for decoding a whole layer that belongs to a current video stream. The videostream may further include a VPS extension area including additional information of a VPS.

The bitstream generator 14 may generate RAP reference layer number information indicating the number of layers referred to for performing inter-layer prediction on current layer RAP images and non-RAP reference layer number information indicating the number of different layers referred to for performing inter-layer prediction on current layer non-RAP images, for each layer, for each layer bitstream included in the current video stream.

The bitstream generator 14 may also generate RAP reference layer identification information according to layers referred to for predicting a current layer RAP image and non-RAP reference layer identification information according to layers referred to for predicting a current layer non-RAP image, for each layer.

The RAP reference layer identification information may be determined by as many as the number of layers indicating the RAP reference layer number information. Similarly, the non-RAP reference layer identification information may be determined by as many as the number of layers indicating the non-RAP reference layer number information.

Therefore, the bitstream generator 14 may generate a bitstream including the RAP reference layer number information, the non-RAP reference layer number information, the RAP reference layer identification information, and the non-RAP reference layer identification information that are defined for each layer.

The video stream encoding apparatus 10 according to an exemplary embodiment may encode each view image sequence included in a multi-view video as different layers. In this case, the bitstream generator 14 may further include, in the bitstream, view identification information indicating which view images among multi-view images indicate current layer images for each layer. The view identification information may be determined by as many as the number of video layers encoded for the current video stream.

A base layer video may be encoded without using a different layer video. Thus, only when a current layer is not a base layer, may the RAP reference layer number information, the non-RAP reference layer number information, the RAP reference layer identification information, and the non-RAP reference layer identification information be determined for each layer.

The bitstream generator 14 according to an exemplary embodiment may encapsulate the bitstream in the form of a high efficiency video coding (HEVC) network abstract layer (NAL) unit. The bitstream generator 14 may record the RAP reference layer number information, the non-RAP reference layer number information, the RAP reference layer identification information, and the non-RAP reference layer identification information in the VPS extension area included on a raw byte sequence payload (RBSP) of each HEVC NAL unit.

The view identification information allocated for each video layer encoded for the current video stream may be included in the VPS extension area of a NAL unit of a video stream.

The video stream encoding apparatus 10 according to an exemplary embodiment may not restrict performing encoding according to a same encoding standard method for all layers since each layer is individually encoded.

The bitstream generator 14 may generate and include, in the bitstream, multiple standard use information indicating two or more encoding standard methods are used for a plurality of layers of the current video stream. The multiple standard use information may also be recorded on the VPS extension area as information regarding a whole layer.

Only a predetermined layer among a plurality of layers may be encoded according to a profile and a level of a predetermined standard method, other than a base standard method. In a multi-view scalable encoding method in which each of the plurality of layers corresponds to each view of a multi-view video, only a base view or predetermined additional view layer may be encoded by using a method other than the base standard method.

Therefore, the multiple standard use information according to an exemplary embodiment may include information regarding the profile and the level of the predetermined standard method that is a method of encoding images of a predetermined layer among the base view layer and the additional view layers of the multi-view video.

For example, if a predetermined standard method for a predetermined layer image is H.264/AVC other than HEVC that is a base standard method, the bitstream generator 14 may record information regarding a profile and a level of the H.264 standard as the multiple standard use information. A bitstream encapsulated by using the H.264 NAL unit as a header of the HEVC NAL unit may be generated.

Figure 2A:
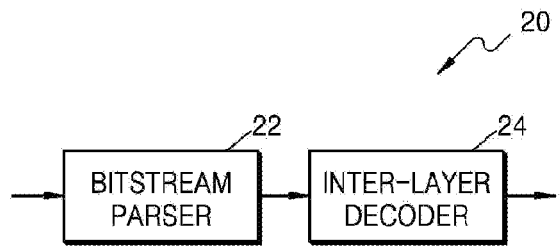
FIG. 2A is a block diagram of a video stream decoding apparatus according to an exemplary embodiment.
Figure 2B:
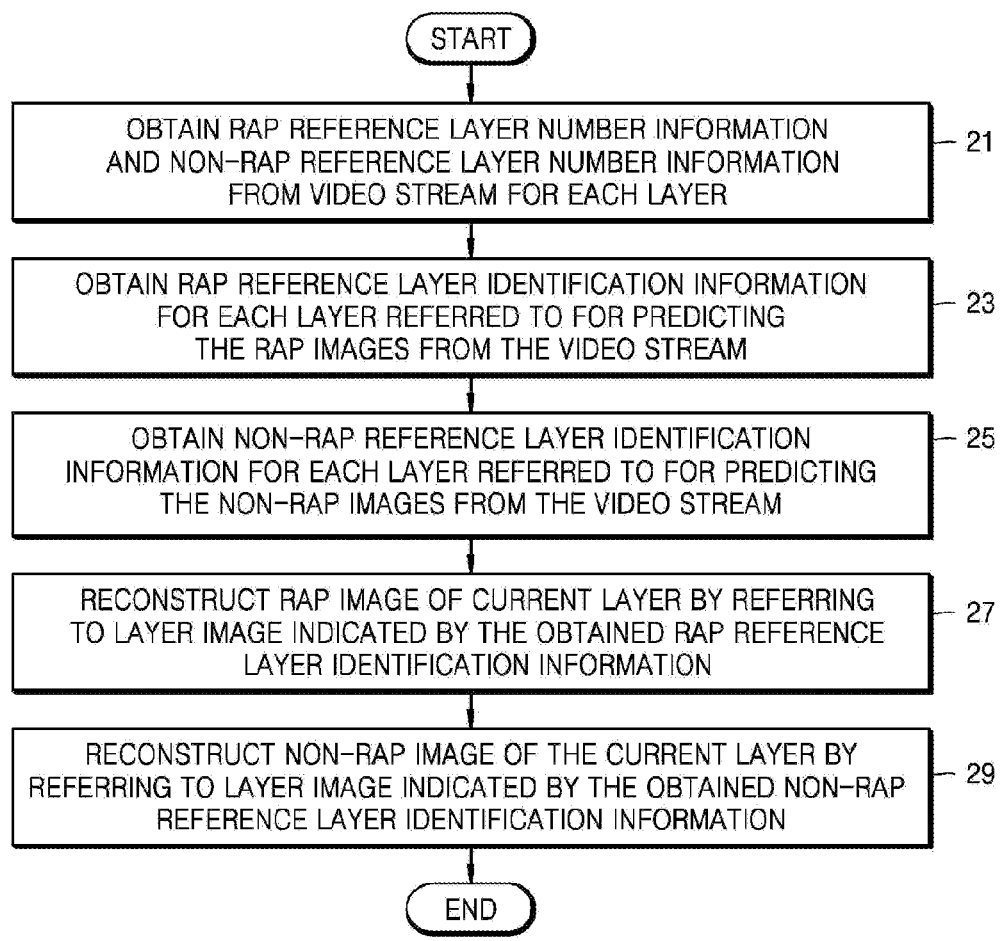
FIG. 2B is a flowchart of a video stream decoding method according to an exemplary embodiment.

FIG. 2A is a block diagram of a video stream decoding apparatus 20 according to an exemplary embodiment. FIG. 2B is a flowchart of a video stream decoding method according to various exemplary embodiments.

The video stream decoding apparatus 20 according to an exemplary embodiment includes a bitstream parser 22 and an inter-layer decoder 24.

The video stream decoding apparatus 20 may receive a base layer stream and an improvement layer stream. The video stream decoding apparatus 20 may receive the base layer stream recording encoding data of base layer images as a base layer stream, and the improvement layer stream recording encoding data of improvement layer images as an improvement layer stream, according to scalable video coding.

The video stream decoding apparatus 20 may decode a plurality of layer streams according to the scalable video coding. The video stream decoding apparatus 20 may reconstruct base layer images by decoding the base layer stream and reconstruct improvement layer images by decoding the improvement layer stream.

For example, a multi-view video may be encoded according to the scalable video coding. For example, left-view images may be reconstructed by decoding the base layer stream, and right-view images may be reconstructed by decoding the improvement layer stream. As another example, center-view images may be decoded by decoding the base layer stream. The left-view images may be reconstructed by further decoding a first improvement layer stream in addition to the base layer stream. The right-view images may be reconstructed by further decoding a second improvement layer stream in addition to the base layer stream.

In a case where there are three or more improvement layers, first improvement layer images with respect to a first improvement layer may be reconstructed from the first improvement layer stream, and second improvement layer images may be further reconstructed if a second improvement layer stream is further decoded. Kth improvement layer images may be further reconstructed if the Kth improvement layer stream is further decoded in addition to the first improvement layer stream.

The video stream decoding apparatus 20 may obtain encoded data of base layer images and improvement layer images from the base layer stream and the improvement layer stream, and may further obtain a motion vector generated through inter prediction and disparity information generated through inter layer prediction.

For example, the video stream decoding apparatus 20 may decode inter-predicted data for each layer and may decode inter-layer predicted data between a plurality of layers. Reconstruction may be performed through motion compensation and inter-layer decoding based on an encoding unit or a prediction unit according to an exemplary embodiment.

Images may be reconstructed by performing motion compensation for a current image with reference to reconstructed images predicted through inter-prediction of a same layer for each layer stream. Motion compensation may refer to an operation of synthesizing a reference image determined by using a motion vector of the current image and a residual of the current image and reconfiguring a reconstruction image of the current image.

The video stream decoding apparatus 20 according to an exemplary embodiment may perform inter-layer decoding with reference to base layer images so as to reconstruct an improvement layer image predicted through inter-layer prediction. Inter-layer decoding may refer to an operation of synthesizing a reference image of a different layer determined by using the disparity information of the current image and the residual of the current image and reconfiguring the reconstruction image of the current image.

The video stream decoding apparatus 20 according to an exemplary embodiment may perform inter-layer decoding for reconstructing the second improvement layer images predicted with reference to the improvement layer images.

The video stream decoding apparatus 20 decodes each image of a video for each block. A block according to an exemplary embodiment may include a maximum encoding unit, an encoding unit, a prediction unit, a transformation unit, etc., among encoding units according to a tree structure. For example, the video stream decoding apparatus 20 may decode each layer stream based on blocks of a quadtree structure determined according to an HEVC standard method to reconstruct image sequences.

The inter-layer decoder 24 may obtain symbol data reconstructed through entropy decoding for each layer. The inter-layer decoder 24 may perform inverse quantization and inverse transformation by using the symbol data to reconstruct quantized transformation coefficients of the residual. The inter-layer decoder 24 according to another exemplary embodiment may receive a bitstream of the quantized transformation coefficients. A residual of the images may be reconstructed as a result of performing inverse quantization and inverse transformation on the quantized transformation coefficients.

The inter-layer decoder 24 according to an exemplary embodiment may reconstruct an image sequence for each layer by decoding a bitstream received for each layer.

The inter-layer decoder 24 may generate reconstruction images of the image sequence of each layer through inter-layer prediction between different layer images and through motion compensation between same layer images.

Therefore, the inter-layer decoder 24 according to an exemplary embodiment may decode the image sequence of each layer with reference to an image sequence of a same layer or an image sequence of a different layer according to a prediction mode. For example, in an intra prediction mode, a current block may be reconstructed by using adjacent samples in a same image, and, in an inter prediction mode, the current block may be reconstructed with reference to a different image of a same layer. In an inter layer prediction mode, the current block may be reconstructed by using a reference image to which a same POC as that of the current image is allocated among images of a different layer.

The inter-layer decoder 24 according to an exemplary embodiment may decode base layer RAP images that are an I-picture type among base layer images without referring to a different image. The base layer RAP images that are the I-picture type may be one of randomly accessible CRA images, BLA images, and IDR images.

An IDR image may be encoded only as an I slice type. A decoded picture buffer (DPB) may be emptied before the IDR image is decoded.

An image following a CRA image in both a decoding order and a reproduction order may not refer to an image previous to the CRA image in the decoding order or the reproduction order. The image previous to the CRA image in the decoding order may also precede the CRA image in the reproduction order. If the current image does not precede a BLA image in both the decoding order and the reproduction order, prediction may be performed on the current image with reference to an image previous to the BLA image in one of the decoding order and the reproduction order.

An RAP image according to an exemplary embodiment does not refer to a different image included in an image sequence of a same stream, and thus the inter-layer decoder 24 may immediately decode and reconstruct the RAP image without a previously reconstructed image.

The bitstream parser 22 according to an exemplary embodiment may parse encoding data of a base layer RAP image and encoding data of base view non-RAP images from the base layer bitstream. The bitstream parser 22 may parse motion vectors generated through inter prediction between base layer images from the base layer bitstream.

The inter-layer decoder 24 may reconstruct non-RAP images among base layer images with reference to different images of a same layer. A residual and a motion vector through inter prediction may be obtained for base layer non-RAP images. The inter-layer decoder 24 may determine a reference block of the current block of a non-RAP image within the reference image by using the motion vector and may reconstruct the current image through a motion compensation process of combining the reference block and the residual.

The inter-layer decoder 24 may reconstruct the base layer RAP images with reference to adjacent pixels within an image through intra prediction.

The bitstream parser 22 according to an exemplary embodiment may parse encoded data of improvement layer images from the improvement layer bitstream. The bitstream parser 22 according to an exemplary embodiment may parse data encoded for different improvement layers from each improvement layer bitstream when receiving a plurality of improvement layer bitstreams. For convenience of description, an operation of decoding an improvement layer performed by the inter-layer decoder 24 according to an exemplary embodiment will be described as an operation performed on improvement layer images of one layer. However, the operation of the inter-layer decoder 24 is not performed only on the improvement layer images of one layer but may be applied to each of different improvement layer images.

The bitstream parser 22 according to an exemplary embodiment may parse encoding data of an improvement layer RAP image and encoding data of improvement layer non-RAP images. The bitstream parser 22 may parse motion vectors generated through inter prediction between improvement layer images and disparity vectors generated through inter layer prediction from the improvement layer bitstream.

The inter-layer decoder 24 according to an exemplary embodiment may perform inter layer decoding referring to different layer images and motion compensation referring to the same layer images, so as to decode the improvement layer image.

The inter-layer decoder 24 may determine a reference block of a current block within a reference image of a same layer and, through a motion compensation process of combining the reference block and a residual, may reconstruct the improvement layer image.

The inter-layer decoder 24 may determine the reference block of the current block within a reference image of a different layer and, through an inter layer decoding process of combining the reference block and the residual, may reconstruct the improvement layer image.

An additional layer RAP image may be reconstructed by using a RAP image of a base layer or a different layer. For example, the additional view RAP image may be reconstructed by using a different view RAP image.

Thus, there may be a difference between a RAP image and a non-RAP image in a method of referring to a previously reconstructed image. Thus, a reference layer used to predict the RAP image and the non-RAP image may be different.

Detailed operations of determining a parameter related to a reference layer for inter layer prediction of the RAP image and the non-RAP image performed by the video stream decoding apparatus 20 will now be described with reference to FIG. 2B below.

In operation S21, the bitstream parser 22 may obtain RAP reference layer number information and non-RAP reference layer number information from a video stream regarding images encoded for a plurality of layers. The RAP reference layer number information and the non-RAP reference layer number information may be obtained for each layer defined from a current video stream.

The bitstream parser 22 may further obtain view identification information indicating which view images among multi-view images are current layer images for each layer.

In a case where a current layer is not a base layer, the bitstream parser 22 may obtain the RAP reference layer number information, the non-RAP reference layer number information, RAP reference layer identification information, and non-RAP reference layer identification information from the video stream for each layer.

For example, the bitstream parser 22 may receive an encapsulated bitstream from an HEVC NAL unit. The bitstream parser 22 may obtain the RAP reference layer number information, the non-RAP reference layer number information, RAP reference layer identification information, and non-RAP reference layer identification information from a VPS extension area included in an RBSP of each NAL unit of the bitstream.

In operation S23, the bitstream parser 22 may obtain the RAP reference layer identification information for each layer referred to for predicting a RAP image from the video stream based on the RAP reference layer number information.

The bitstream parser 22 may determine the number of different layers referred to for inter layer prediction of RAP images among current layer images based on the RAP reference layer number information for each layer. Thus, the bitstream parser 22 may obtain RAP identification information for each reference layer for the RAP images.

In operation S25, the bitstream parser 22 may obtain non-RAP reference layer identification information for each layer referred to for predicting a non-RAP image from the video stream based on the non-RAP reference layer number information.

The bitstream parser 22 may determine the number of different layers referred to for inter layer prediction of non-RAP images among the current layer images based on the non-RAP reference layer number information for each layer. Thus, the bitstream parser 22 may obtain non-RAP identification information for each reference layer for the non-RAP images.

In operation S27, the inter-layer decoder 24 may reconstruct a RAP image of a current layer with reference to a layer image indicating the RAP reference layer identification information obtained by the bitstream parser 22.

In operation S29, the inter-layer decoder 24 may reconstruct a non-RAP image of the current layer with reference to a layer image indicating the non-RAP reference layer identification information obtained by the bitstream parser 22.

In operations S27 and S29, the inter-layer decoder 24 may reconstruct current layer RAP images by using images of an RAP reference layer and may reconstruct current layer non-RAP images by using images of a non-RAP reference layer according to an inter layer prediction structure, for each additional layer other than a base layer.

The bitstream parser 22 may further obtain multiple standard use information from the video stream. If the multiple standard use information indicates that two or more encoding standard methods are used for a layer, the bitstream parser 22 may further obtain information regarding a profile and a level of a predetermined standard method that is a method of encoding images of a predetermined layer among a base view layer and additional view layers of the multi-view video from the bitstream.

For example, in a case where the predetermined standard method for the predetermined layer image is H.264/AVC other than HEVC, the bitstream parser 22 may receive a bitstream of an H.264 NAL unit encapsulated as a header of a HEVC NAL unit.

In this case, the inter-layer decoder 24 may reconstruct the images of the predetermined layer according to a standard method determined based on the information regarding the profile and the level of the predetermined standard method.

According to the video stream encoding apparatus 10 and the video stream decoding apparatus 20 according to various exemplary embodiments, different reference layers may be set for the RAP image and the non-RAP image. Inter layer encoding and inter layer decoding may be performed on a plurality of layer streams by using a different standard method other than the HEVC method that is the base standard method. A parameter for inter layer encoding or inter layer decoding on a whole layer including a video is signaled, and thus an inter layer method may be determined in an initialization stage when the video stream is decoded.

An inter layer prediction structure that may be implemented in the encoder 12 of the video stream encoding apparatus 10 according to an exemplary embodiment is described in detail with reference to FIG. 3 below.

Figure 3:
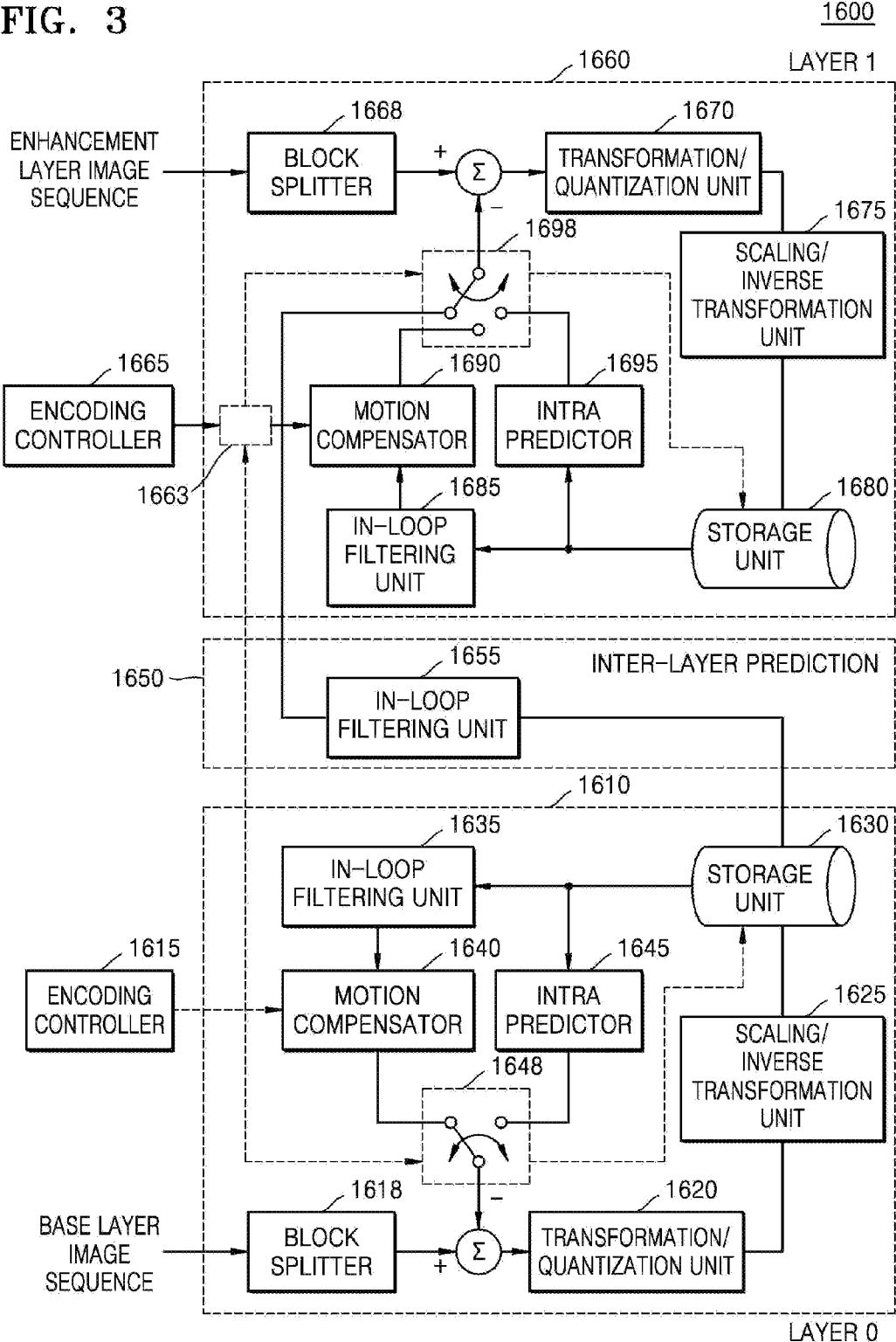
FIG. 3 is a diagram of an inter layer prediction structure according to an exemplary embodiment.

FIG. 3 is a diagram of an inter layer prediction structure according to an exemplary embodiment.

An inter layer encoding system 1600 includes a base layer encoding end 1610, an improvement layer encoding end 1660, and an inter layer prediction end 1650 between the base layer encoding end 1610 and the improvement layer encoding end 1660. The base layer encoding end 1610 and the improvement layer encoding end 1660 may be included in the inter-layer encoder 12.

The base layer encoding end 1610 receives and encodes a base layer image sequence for each image. The improvement layer encoding end 1660 receives and encodes an improvement layer image sequence for each image. Redundant descriptions of similar operations between the base layer encoding end 1610 and the improvement layer encoding end 1660 will be simultaneously given.

Block splitters 1618 and 1668 split input images (a low resolution image and a high resolution image) into a maximum coding unit, an encoding unit, a prediction unit, a transformation unit, etc. To encode the encoding unit output by the block splitters 1618 and 1668, intra prediction or inter prediction may be performed for each prediction unit of the encoding unit. Prediction switches 1648 and 1698 may perform inter prediction with reference to a previous reconstructed image output by motion compensators 1640 and 1690 or may perform intra prediction by using a neighboring prediction unit of a current prediction unit within the current input image output by intra prediction units 1645 and 1695 (e.g., intra predictors) according to whether a prediction mode of the prediction unit is an intra prediction mode or an inter prediction mode. Residual information may be generated for each prediction unit through inter prediction.

Residual information between the prediction unit and an adjacent image is input into transformation/quantization unit 1620 and 1670 (e.g., transformer/quantizers) for each prediction unit of the encoding unit. The transformer/quantizers 1620 and 1670 may perform transformation and quantization for each transformation unit based on the transformation unit of the encoding unit and may output a quantized transformation coefficient.

Scaling/inverse transformation units 1625 and 1675 (e.g., Scaler/inverse transformer) may perform scaling and inverse transformation on the quantized transformation coefficient for each transformation unit of the encoding unit again to generate residual information of a spatial area. When an inter mode is configured by the prediction switches 1648 and 1698, the residual information is combined with the previous reconstruction image or the neighboring prediction unit, thereby generating a reconstruction image including a current prediction unit, and storing a current reconstruction image in storages 1630 and 1680 (e.g., storage units). The current reconstruction image may be transferred to intra prediction units 1645 and 1695 or motion compensators 1640 and 1690 according to a prediction mode of a prediction unit encoded later.

In particular, in the inter mode, in-loop filtering units 1635 and 1685 may perform at least one selected from deblocking filtering and sample adaptive offset (SAO) filtering for each encoding unit on the reconstruction image stored in the storages 1630 and 1680.

Deblocking filtering is filtering for relaxing a blocking phenomenon of the data unit. SAO filtering is filtering for compensating for a pixel value modified by data encoding and decoding. Data filtered by the in-loop filtering units 1635 and 1685 may be transferred to the motion compensation units 1640 and 1690 for each prediction unit. Residual information between the current reconstruction image output by the motion compensation units 1640 and 1690 and the block splitters 1618 and 1668 and a next encoding unit may be generated, to encode an encoding unit of a next order output by the block splitters 1618 and 1668 again.

In this way, the above-described encoding method may be repeated for each encoding unit of the input image.

The improvement layer encoding end 1660 for inter layer prediction may refer to the reconstruction image stored in the storage 1630 of the base layer encoding end 1610. An encoding controller 1615 of the base layer encoding end 1610 may control the storage 1630 of the base layer encoding end 1610 and may transfer the reconstruction image of the base layer encoding end 1610 to the improvement layer decoding end 1660. The inter layer prediction end 1650 may perform deblocking filtering or SAO filtering on the base layer reconstruction image output by the storage 1610 of the base layer encoding end 1610. When a resolution differs between images of the base layer and that of the improvement layer, the inter layer prediction end 1650 may upsample the reconstruction image of the base layer and may transfer the reconstruction image to the improvement layer encoding end 1660. When inter layer prediction is performed according to control of the switch 1698 of the improvement layer encoding end 1660, inter layer prediction may be performed on the improvement layer image with reference to the base layer reconstruction image transferred through the inter layer prediction end 1650.

For encoding of an image, various encoding modes for the encoding unit, the prediction unit, and the transformation unit may be set. For example, a depth or a split flag, etc., may be set as an encoding mode with respect to the encoding unit. A prediction mode, a partition type, intra direction information, reference list information, etc., may be set as an encoding mode with respect to the prediction unit. A transformation depth or the split flag, etc., may be set as an encoding mode with respect to the transformation unit.

The base layer encoding end 1610 may determine an encoding depth having a highest encoding efficiency, a prediction mode, a partition type, an intra direction/reference list, a transformation depth, etc., according to a result of performing encoding by applying various depths for the encoding unit, various prediction modes with respect to the prediction unit, various partition types, various intra directions, various reference lists, and various transformation depths for the transformation unit, respectively. However, the exemplary embodiments are not limited to the encoding modes determined by the base layer encoding end 1610.

The encoding controller 1615 of the base layer encoding end 1610 may control various encoding modes to be appropriately applied to operations of the elements. The encoding controller 1615 may control the improvement layer encoding end 1660 to determine the encoding mode or the residual information by referring to an encoding result of the base layer encoding end 1610, for inter layer encoding of the improvement layer encoding end 1660.

For example, the improvement encoding end 1660 may determine an encoding mode for the improvement layer image by using the encoding mode of the base layer encoding end 1610 as an encoding mode of the improvement layer image or by referring to the encoding mode of the base layer encoding end 1610. The encoding controller 1615 of the base layer encoding end 1610 may control a control signal of the encoding controller 1655 of the improvement layer encoding end 1660 so that the improvement layer encoding end 1660 may use a current encoding mode from the encoding mode of the base layer encoding end 1610, to determine the current encoding mode.

Similarly to the inter layer encoding system 1600 according to the inter layer prediction method of FIG. 3, an inter layer decoding system according to the inter layer prediction method may be implemented. That is, the inter layer decoding system of a multi-layer video may receive a base layer bitstream and an improvement layer bitstream. A base layer decoding end of the inter layer decoding system may decode the base layer bitstream to reconstruct base layer images. An improvement layer decoding end of the inter layer decoding system of the multi-layer video may use a base layer reconstruction image and parsed encoding information to decode the improvement layer bitstream and reconstruct improvement layer images.

If the inter-layer encoder 12 of the video stream decoding apparatus 10 according to an exemplary embodiment performs inter layer prediction, the decoder 26 of the video stream decoding apparatus 20 may reconstruct multi-layer images according to the above-described inter layer decoding system.

Exemplary embodiments in which the video stream encoding apparatus 10 and the video stream decoding apparatus 20 apply an inter layer prediction structure regarding a multi-view video will now be described in detail with reference to FIGS. 4 through 6. An individual view video is applied to one layer in an inter-view prediction structure of the multi-view video, and thus the inter-view prediction structure may be interpreted as the inter layer prediction structure.

Figure 4:
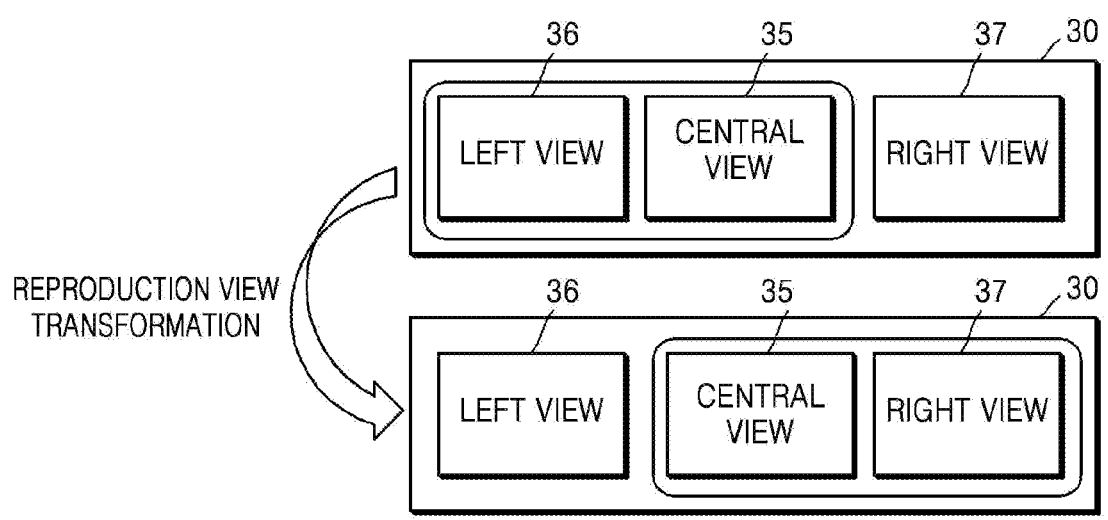
FIG. 4 is a block diagram of an inter layer prediction structure of a multi-view video stream according to an exemplary embodiment.

FIG. 4 is a block diagram of an inter layer prediction structure of a multi-view video stream 30 according to an exemplary embodiment.

The multi-view video stream 30 according to an exemplary embodiment includes a central view substream 35, a left view substream 36, and a right view substream 37.

The central view substream 35 includes a bitstream generated by encoding central view images. The left view substream 36 includes a bitstream generated by encoding left view images. The right view substream 37 includes a bitstream generated by encoding right view images.

Only substreams of specific views may be extracted, decoded, and reproduced from the multi-view video stream 30 without having to decode substreams of all views to decode video of desired views. The multi-view video stream 30 includes streams of a plurality of views, thereby selecting reproduction views.

For example, when only a central view video and a left view video are selected to be reproduced, the central view substream 35 and the left view substream 36 may be extracted and decoded.

A view may be switched to reproduce the central view video and the left view video while reproducing the central view video and the left view video. In this case, the central view substream 35 and the right view substream 37 may be extracted and decoded after switching a reproduction view while extracting and decoding the central view substream 35 and the left view substream 36 from the multi-view video stream 30.

According to the related art, a point used to switch the reproduction view is limited to a random access point such as a CRA image, a BLA image, or an IDR image, i.e., a RAP image.

A functionality of the RAP image in the inter layer prediction structure of the multi-view video is described in detail with reference to FIGS. 5A through 5D below.

FIGS. 5A through 5D are diagrams of reproduction orders 40 and 48 and coding orders 46 and 47 of an inter layer prediction structure of a multi-view video, respectively, according to an exemplary embodiment.

According to the reproduction orders 40 and 48 and the coding orders 46 and 47 of the inter layer prediction structure of the multi-view video, images of the same view may be arranged in a horizontal direction. Thus, left view images "Left" may be arranged in a line in the horizontal direction, base view images "Center" may be arranged in a line in the horizontal direction, and right view images "Right" may be arranged in a line in the horizontal direction. The base view images may be center view images compared to the left and right view images.

Images having the same POC order may be arranged in a vertical direction. A POC of images is a reproduction order of images constituting video. "POC X" in the reproduction order 40 indicates a relative reproduction order of images positioned in a corresponding column. The smaller the number of X, the earlier the reproduction order, and the greater the number of X, the later the reproduction order.

Therefore, according to the reproduction orders 40 and 48 of the multi-view video prediction structure, the left view images "Left" may be arranged in the horizontal direction according to the POC (reproduction order), the base view images "Center" may be in the horizontal direction according to the POC (reproduction order), and the right view images "Right" may be arranged in the horizontal direction according to the POC (reproduction order). The left and right view images positioned in the same column as that of the base view images have different views but have the same POC (reproduction order).

Four consecutive images of view images constitute a single GOP. Each GOP includes images between consecutive RAP images and a single RAP image. In this regard, the RAP image may be an anchor picture.

The RAP image is a random access point. In this regard, when a predetermined reproduction position is selected from images that are arranged according to a reproduction order of video, that is, according to a POC, a RAP image of which a POC is closest to the reproduction position is reproduced. The base view images include base view RAP images 41, 42, 43, 44, and 45, the left view images include left view RAP images 141, 142, 143, 144, and 145, and the right view images include right view RAP images 241, 242, 243, 244, and 245.

Multi-view images may be reproduced and predicted (restored) according to a GOP order. According to the reproduction order 40 of the multi-view video prediction structure of FIG. 5A, images included in a GOP 0 are reproduced according to views and then images included in a GOP 1 may be reproduced. That is, images included in each GOP may be reproduced in the order of GOP 0, GOP 1, GOP 2, and GOP 3. According to the coding order 46 of the multi-view video prediction structure of FIG. 5B, the images included in the GOP 0 are predicted (restored) according to views and then the images included in the GOP 1 may be predicted (restored). That is, the images included in each GOP may be reproduced in the order of GOP 0, GOP 1, GOP 2, and GOP 3.

According to the reproduction order 40 and the coding order 46 of the multi-view video prediction structure, both inter-view prediction and inter prediction may be performed on images. In the reproduction order 40, an image from which an arrow starts, and an image to which an arrow is directed is an image that is predicted by using the reference image.

In particular, according to the coding order 46 of the multi-view video prediction structure, images may be arranged in the horizontal direction according to a prediction (restoration) order of each image. That is, relatively left positioned images may be earlier predicted (restored) images, and relatively right positioned images may be later predicted (restored) images. Next images are predicted (restored) by referring to the earlier restored images, and thus all arrows indicating prediction directions between images of the same view may be directed to the relatively right positioned images from the relatively left positioned images.

A predicting result of the base view images may be encoded and then may be output in the form of a base view image stream, and a prediction result of the additional view images may be encoded and then may be output in the form of an additional view image stream. In addition, a predicting result of the left view images may be output in a first additional view image stream and a predicting result of the right view images may be output in a second additional view image stream.

Only inter prediction is performed on base view images. That is, the RAP images 41, 42, 43, 44, and 45 that are I-picture type pictures do not refer to different images, whereas the remaining images that are B-picture type images and b-picture type images are predicted with reference to different base view images. The B-picture type images are predicted with reference to an I-picture type RAP image having a preceding POC order and an I-picture type RAP image having a later POC order. b-picture type images are predicted with reference to an I-picture type RAP image having a preceding POC order and a B-picture type image having a later POC order or a B-picture type image having a preceding POC order and an I-picture type RAP image having a later POC order.

Inter-view prediction referring to different view images and inter prediction referring to the same view images are performed on the left view images and the right view images.

Like the base view images, inter prediction is also performed on the left view images and inter prediction is also performed on the right view images. The RAP images 141, 142, 143, 144, 145, 241, 242, 243, 244, and 245 from among the left view images and the right view images do not refer to the same view images, and the remaining images that are not RAP images are predicted with reference to the same view images.

However, the RAP images 141, 142, 143, 144, 145, 241, 242, 243, 244, and 245 from among the left view images and the right view images are P-picture type images with reference to base view RAP images 41, 42, 43, 44, and 45 having the same POC order.

Since inter-view prediction referring to different view images having the same POC order, as well as inter prediction, may be performed on the remaining images that are not the RAP images 141, 142, 143, 144, 145, 241, 242, 243, 244, and 245 from among the left view images and the right view images, the remaining images are B-picture type images or b-picture type images.

A restoration process for reproducing images is similar to a prediction process. However, each image may be restored by using a reference image only after the reference image of each image is restored.

First, base view images may be restored via inter prediction. If the base view RAP images 41, 42, 43, 44, and 45 that are I-picture type images are restored, base view images that are B-picture type images may be restored via motion compensation referring to the base view RAP images 41, 42, 43, 44, and 45. Base view images that are b-picture type images may be restored via motion compensation referring to I-picture type or B-picture type base view restoration images.

The left view images and the right view images are encoded via inter-view prediction referring to the base view images and inter prediction referring to the same view images.

In more detail, after a reference image of a base view and a reference image of a left view are restored, the left view images may be restored via inter-view disparity compensation referring to the restored base view images and inter motion compensation referring to the restored reference image of the left view.

In more detail, after a reference image of a base view and a reference image of a right view are restored, the right view images may be restored via inter-view disparity compensation referring to the reference image of the base view and inter motion compensation referring to the restored reference image of the right view.

During a multi-view video decoding process, additional view images need to be restored by referring to base view images, and thus the base view images may be restored earlier than the additional view images. During restoration of the additional view images by referring to the restored base view images, view switching may occur. For example, view switching may occur in order to restore right view images during restoration of left view images. When view switching occurs, a random access may be necessary at a newly reconstructed view.

Figure 5B:
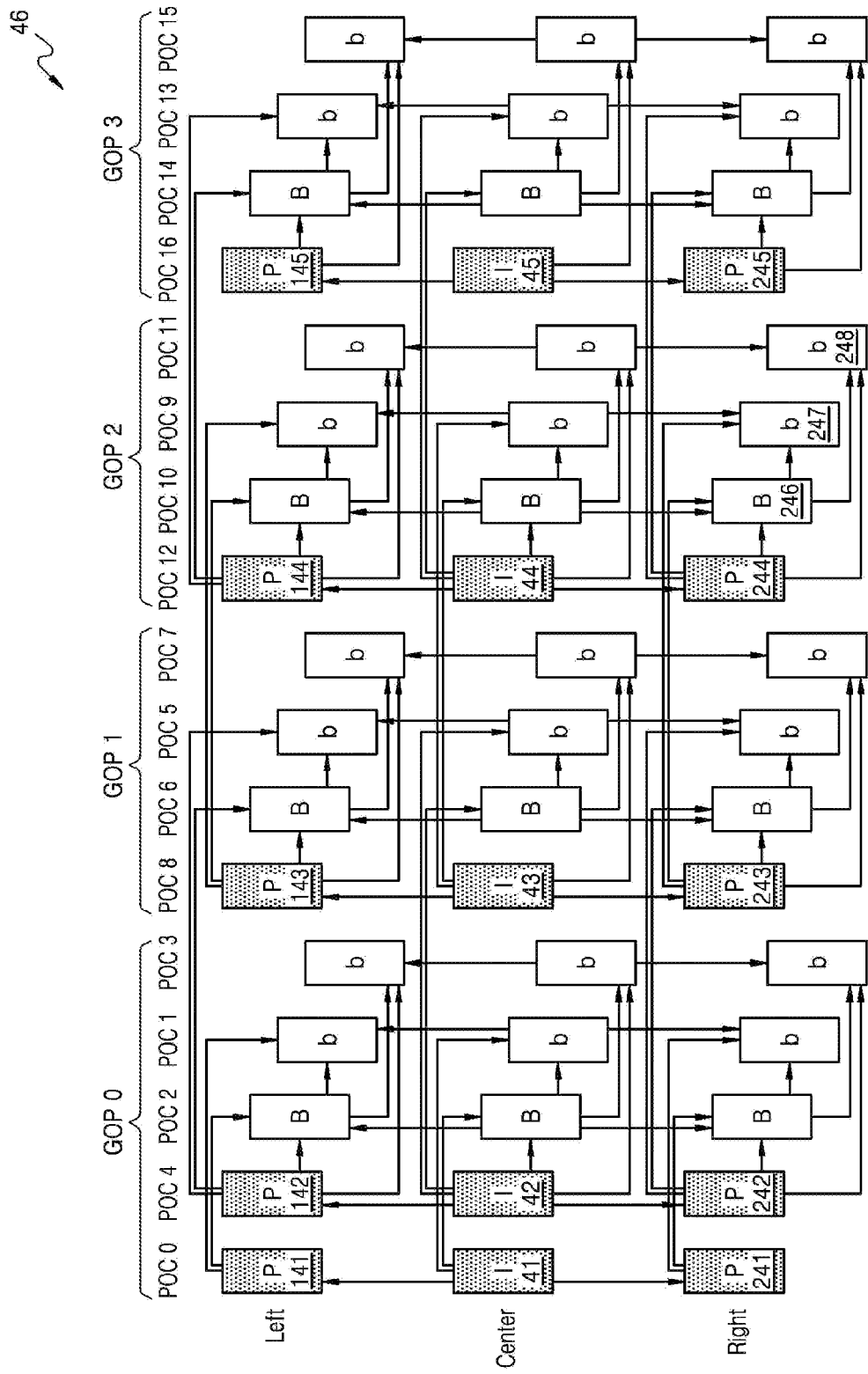
Figure 5C:
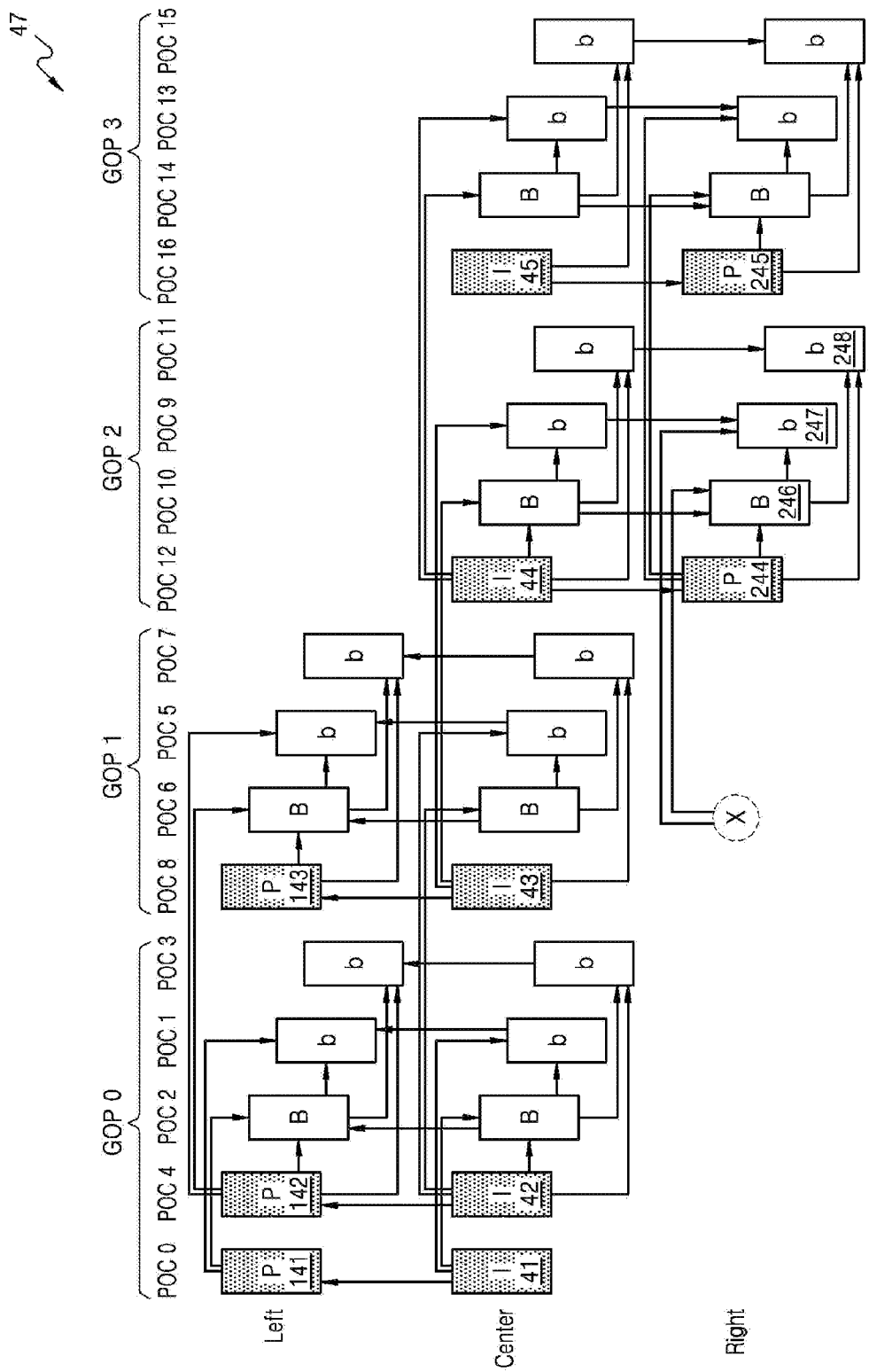
Figure 5D:
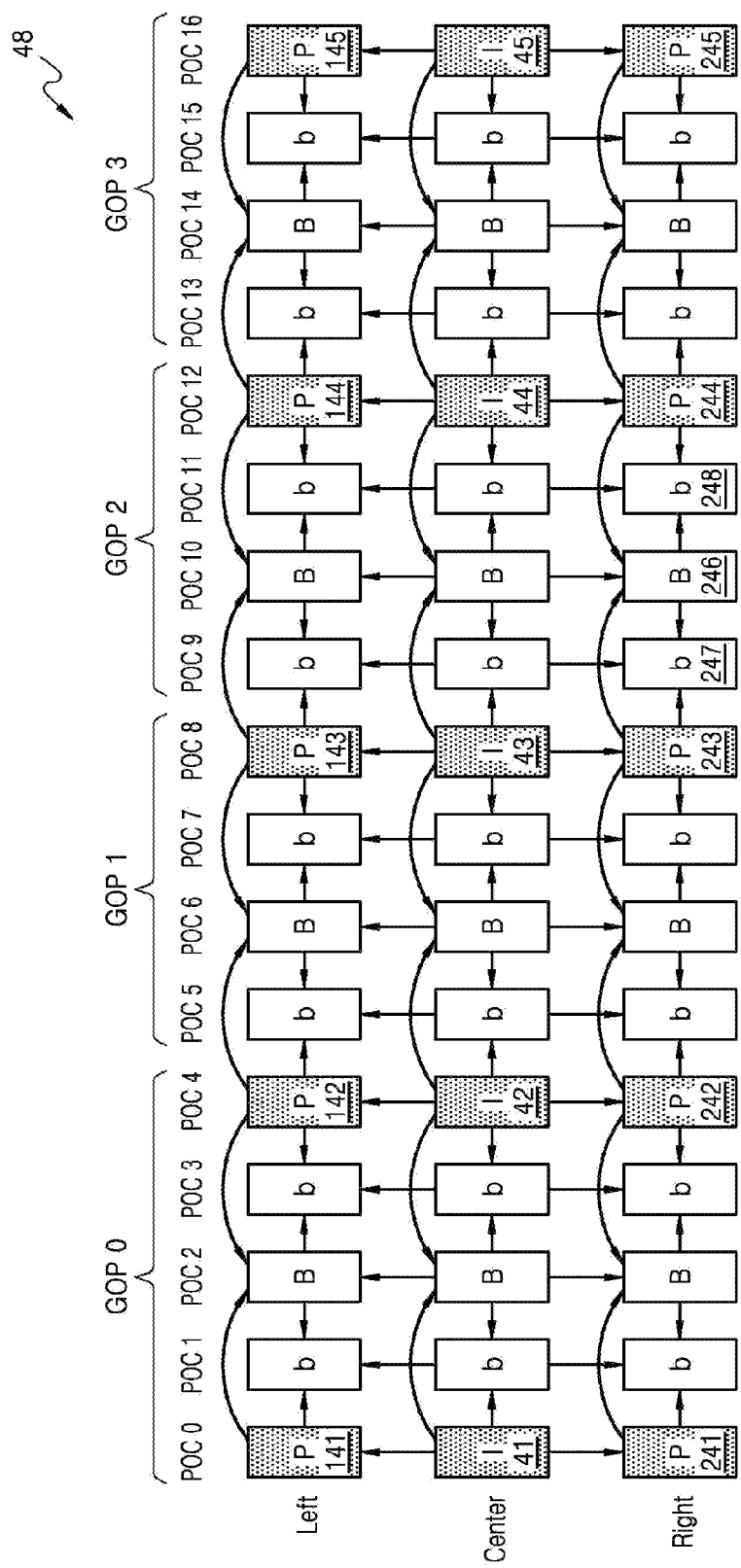

FIG. 5C shows the coding order 47 in a case where view switching occurs in order to restore right view images during restoration of left view images. It is assumed that view switching occurs after left view images from GOP 0 to GOP 1 are restored. Left view images need to be restored to GOP 1, and right view images need to be restored from GOP 2. However, since right view images of GOP 1 are not restored, and a right view RAP image 243 of GOP 1 is not also restored, it is impossible to perform motion compensation on right view images 246 and 247 of GOP 2 predicted with reference to the right view RAP image 243, and thus the right view images 246 and 247 may not be restored. The right view image 246 of GOP 2 that is a B-picture type image may not be restored, and thus a right view image 248 that is a b-picture type image predicted with reference to the right view image 246 may also not be restored. Thus, when inter prediction is performed by referring to an image that belongs to a previous GOP, images right after view switching occurs during a decoding process may not be completely restored. There is a problem in that among images that are to be restored immediately after view switching occurs, images predicted with reference to a RAP image of a POC previous to a view switching point may not be restored.

In the prediction structure of FIG. 5A, the total number of reference layers for inter-view prediction of a left view image and a right view image is 1. That is, inter-view prediction using only a base view image is performed on the left view image and the right view image.

In the prediction structure of FIG. 5B, the number of reference layers for inter-view prediction of the left view image is 1, whereas the number of reference layers for inter-view prediction of the right view image is 2. Inter-view prediction using only the base view image and the left view image is performed on the right view image.

Exemplary embodiments of an inter layer prediction structure of a multi-view video modified in consideration of a function of a RAP image will now be described with reference to FIGS. 6A and 6B.

Figure 6A:
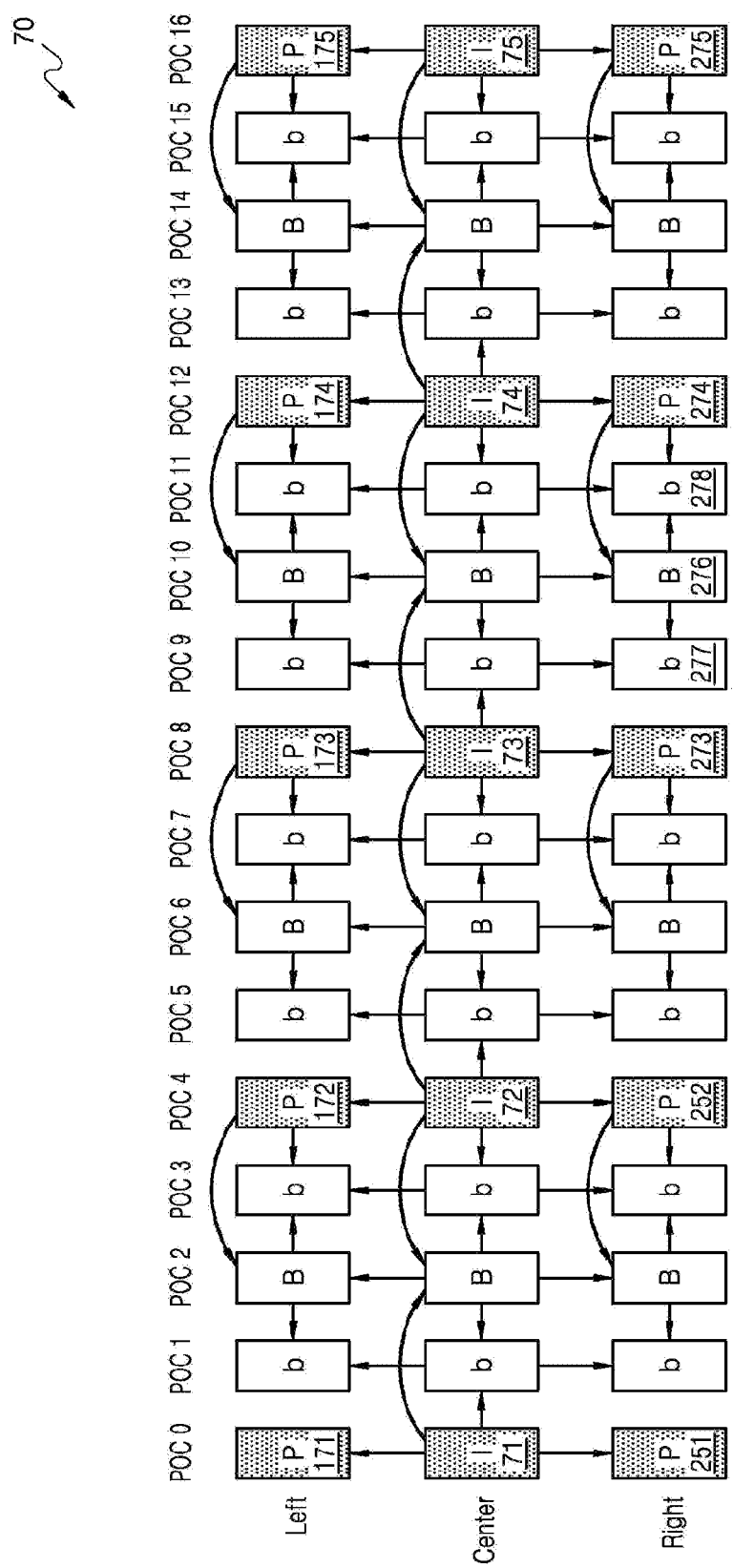
FIGS. 6A and 6B are diagrams of coding orders of an inter layer prediction structure of a multi-view video in consideration of a random access point according to an exemplary embodiment.
Figure 6B:
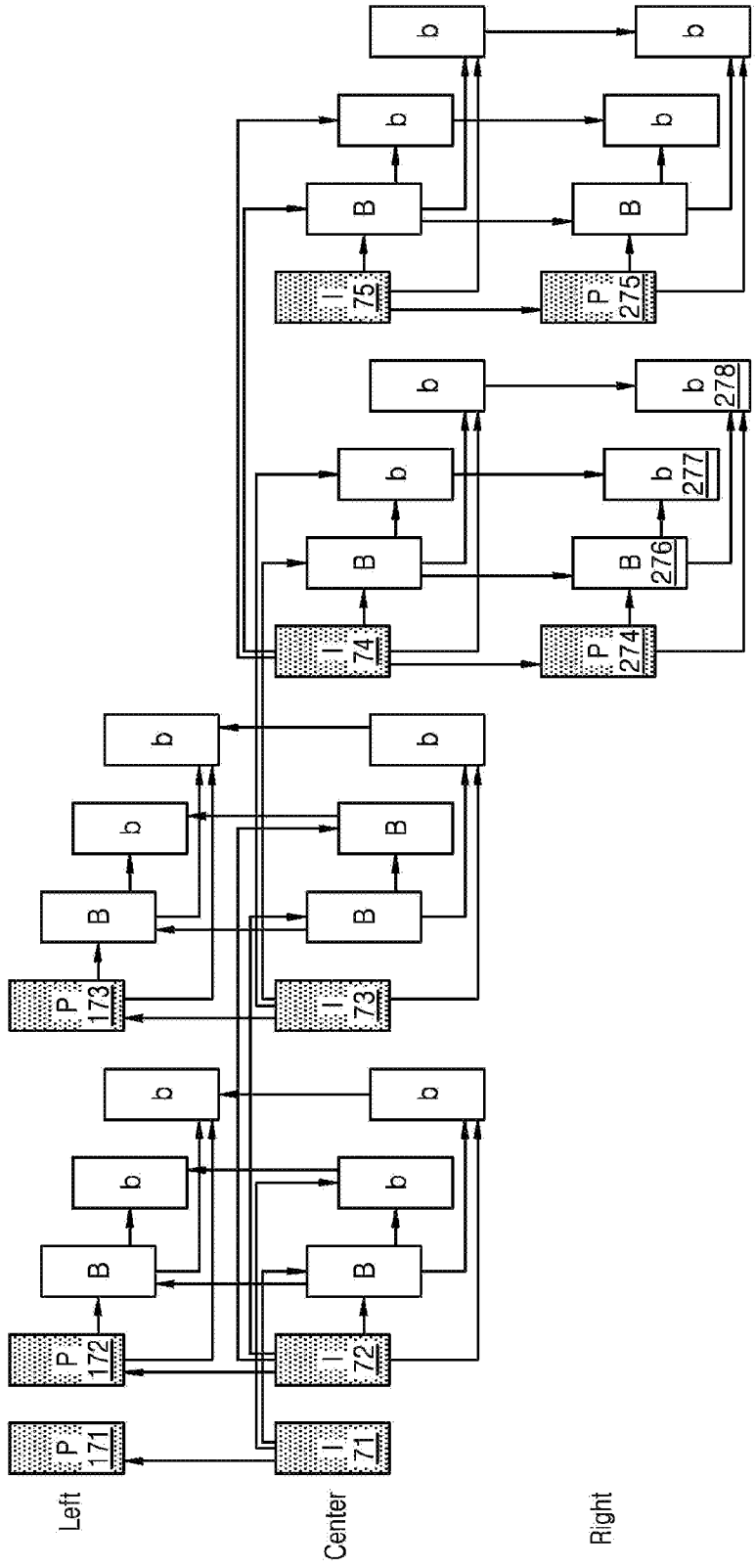

FIGS. 6A and 6B are diagrams of coding orders 70 and 76 of an inter layer prediction structure of a multi-view video in consideration of a random access point according to various exemplary embodiments.

Only inter prediction is performed on base view images in a multi-view video prediction structure according to an exemplary embodiment of FIG. 6A. That is, RAP images 71, 72, 73, 74, and 75 that are I-picture type pictures do not refer to different images, whereas the remaining images that are B-picture type images and b-picture type images are predicted with reference to different base view images. The B-picture type images are predicted with reference to an I-picture type RAP image having a preceding POC order and an I-picture type RAP image having a later POC order. b-picture type images are predicted with reference to an I-picture type RAP image having a preceding POC order and a B-picture type image having a later POC order or a B-picture type image having a preceding POC order and an I-picture type RAP image having a later POC order.

However, a prediction structure of additional view images has a peculiarity in terms of the multi-view video prediction structure according to the exemplary embodiment of FIG. 6A. As described with reference to FIGS. 1A, 1B, 2A, and 2B, at least one view switching section and at least one view renewal image among the additional view images are present in the multi-view video prediction structure according to an exemplary embodiment.

By way of examples of left view images and right view images in the reproduction order 70 of the multi-view video prediction structure according to an exemplary embodiment, a first view switching section may include images from POC 1 to POC 4, a second view switching section may include images from POC 5 to POC 8, a third view switching section may include images from POC 9 to POC 12, and a fourth view switching section may include images from POC 13 to POC 16.

Every time a view switching section is changed, a reproduction view may be changed from a currently reproducing additional view to a different additional view, and thus a next view switching section may be processed after all pictures included in the view switching section starting from a view renewal image are reproduced if a reproduction view of an additional view is switched.

In the multi-view video prediction structure according to the exemplary embodiment of FIG. 6A, a left-view view switching image 172 and a right-view view switching image 252 are positioned in the first view switching section, a left-view view switching image 173 and a right-view view switching image 273 are positioned in the second view switching section, a left-view view switching image 174 and a right-view view switching image 274 are positioned in the third view switching section, and a left-view view switching image 175 and a right-view view switching image 275 are positioned in the fourth view switching section.

Inter-view prediction referring to the base view images and inter prediction referring to the same view images are performed on the left view images and the right view images. However, in the multi-view video prediction structure according to the exemplary embodiment of FIG. 6A, inter prediction referring to images that belong to different view switching sections is not performed. That is, even though images of the first view switching section are first reproduced, images of the second view switching section may not refer to the images of the first view switching section. That is, even through the images of the first view switching section are first reconstructed, the images of the second view switching section do not refer to the images of the first view switching section to perform inter prediction.

The same view images that belong to not only a view switching section previous to, in a reproduction order, a current view switching section to which a current image belongs but also at least one view switching section previous to the current view switching section may be excluded from reference images for inter prediction of images of the current view switching section.

Reconstruction images stored in a reference picture buffer before prediction is performed on a current view renewal image are the same view images reconstructed in a view switching section previous to the current view switching section. Thus, the video stream encoding apparatus 10 according to an exemplary embodiment may delete the reconstruction images stored in the reference picture buffer before predicting the view renewal image. Since no other same view reconstruction image is stored in the reference picture buffer, the video stream encoding apparatus 10 according to an exemplary embodiment may not refer to a view renewal image of a same view in a preceding view switching section and different reconstruction images so as to encode the current view renewal image. However, the video stream encoding apparatus 10 according to an exemplary embodiment may perform inter-view prediction by referring to a base view image to which a same POC is allocated so as to encode the current view renewal image.

The video stream encoding apparatus 10 may refer to previously reconstructed same view images in the current view switching section after encoding the view renewal image included in the current view switching section, so as to encode different images included in the current view switching section. However, since no more of the same view reconstruction images of a preceding view switching section is stored in the reference picture buffer, when images other than the view renewal image included in the current view switching section are encoded, the same view reconstruction image of the preceding view switching section may no longer be referred to.

A multi-view video reconstruction process relating to the multi-view video prediction structure according to an exemplary embodiment of FIG. 6A is the same as described above.

The video stream decoding apparatus 20 according to an exemplary embodiment performs only motion compensation directly and indirectly by referring to a RAP image with respect to base view images, so as to reconstruct base view images.

However, the video stream decoding apparatus 20 according to an exemplary embodiment performs only disparity compensation by referring to base view images and motion compensation by referring to the same view images, so as to reconstruct left view image and right view images.

However, according to the multi-view video prediction structure according to an exemplary embodiment of FIG. 6A, motion compensation by referring to images that belong to different view switching sections is not performed. The same view images that belong to at least one view switching section previous to the current view switching section may be excluded from reference images for inter prediction of images of the current view switching section.

The video stream decoding apparatus 20 according to an exemplary embodiment may also delete the reconstruction images stored in the reference picture buffer before prediction reconstructing the view renewal image. Since no other same view reconstruction image is stored in the reference picture buffer, the video stream decoding apparatus 20 according to an exemplary embodiment may not refer to the view renewal image of the same view in the preceding view switching section having different reconstruction images so as to encode the current view renewal image. However, the video stream decoding apparatus 20 according to an exemplary embodiment may reconstruct the current view renewal image by performing disparity compensation with reference to the base view image to which the same POC is allocated.

The video stream decoding apparatus 20 may refer to the previously reconstructed same view images in the current view switching section after reconstructing the view renewal image included in the current view switching section, so as to encode different images included in the current view switching section. However, since no other same view reconstruction image of the preceding view switching section is stored in the reference picture buffer, when images other than the view renewal image included in the current view switching section are encoded, the same view reconstruction image of the preceding view switching section may no longer be referred to.

The above-described multi-view video prediction structure of FIG. 6A is useful when view switching occurs at a reconstruction view or a reproduction view as shown in FIG. 6B.

FIG. 6B shows the coding order 76 of right view images from left view images when view switching occurs before a third view switching section including a view renewal image of POC 12 during restoration of the left view images in the multi-view video prediction structure of FIG. 6A.

It is assumed that view switching occurs in order to restore right view images in the third view switching section during restoration of left view images in first and second view switching sections. The left view images are reconstructed in the first and second view switching sections, and the right view images are reconstructed in the third view switching section, and thus, the right view images of the second view switching section are not reconstructed. However, since the right view images of the second view switching section are not referred to during a process of predicting right view images 276, 277, and 278 of the third view switching section, even though the right view images of the second view switching section are not reconstructed, the right view images 276, 277, and 278 may be reconstructed through motion compensation referring to previously reconstructed right view images 274 and 276 in the same third view switching section.

Therefore, the multi-view view prediction decoding apparatus 20 according to the multi-view video prediction structures of FIGS. 6A and 6B does not perform motion compensation referring to a same view image that belongs to the view switching section previous to a current GOP to reconstruct additional view images, thereby restoring new additional view images without a decoding error or loss if a reproduction view is switched from a view renewal image closest to a point where view switching occurs although view switching occurs.

The multi-view video prediction structures of FIGS. 6A and 6B are useful, in particular, when view switching frequently occurs.

In more detail, if left view images are reconstructed and reproduced in the first view switching section, and view switching occurs in a view renewal image 172, right view images are decoded in the second view switching section. If the right view images are reconstructed and reproduced in the second view switching section, and view switching occurs in a view renewal image 273, the left view images are decoded in the third view switching section again. If the left view images are reconstructed and reproduced in the third view switching section, and view switching occurs in a view renewal image 174, the right view images are decoded in a fourth view switching section.

Thus, although view switching from a first additional view to a second additional view occurs in a current view switching section, since second additional view images of a next view switching section do not need to refer to reconstruction images of the current view switching section, reconstruction images and base view reconstruction images of the next view switching section may be used to reconstruct second additional view images of the next view switching section. Thus, if the view switching section and the view renewal image according to an exemplary embodiment are used, although view switching frequently occurs, new additional view images may be reconstructed without a decoding error or loss.

A base view RAP image among base view images uses a random access image such as a CRA image, and thus, reconstruction quality of inter-view prediction or disparity compensation referring to base view images may be increased. Thus, although inter prediction or motion compensation is performed on the view renewal image according to an exemplary embodiment, the reconstruction quality of inter-view prediction or disparity compensation referring to base view images may be guaranteed.

Therefore, it may be confirmed from the multi-view prediction structures described with reference to FIGS. 5A through 6 above, that methods of encoding a RAP image and a non-RAP image may be different. Thus, the video stream encoding apparatus 10 and the video stream decoding apparatus 20 according to various exemplary embodiments may individually determine the number of layers referred to by the RAP image and the non-RAP image for inter layer prediction and may determine identification information of each layer. Different video encoding standard methods may be used for layers, thereby determining whether two or more encoding standard methods are applied to a current video.

Hereinafter, various exemplary embodiments in which the video stream encoding apparatus 10 and the video stream decoding apparatus 20 signal information regarding a changeable inter layer prediction method will now be described with reference to FIGS. 7A through 7C.

Figure 7A:
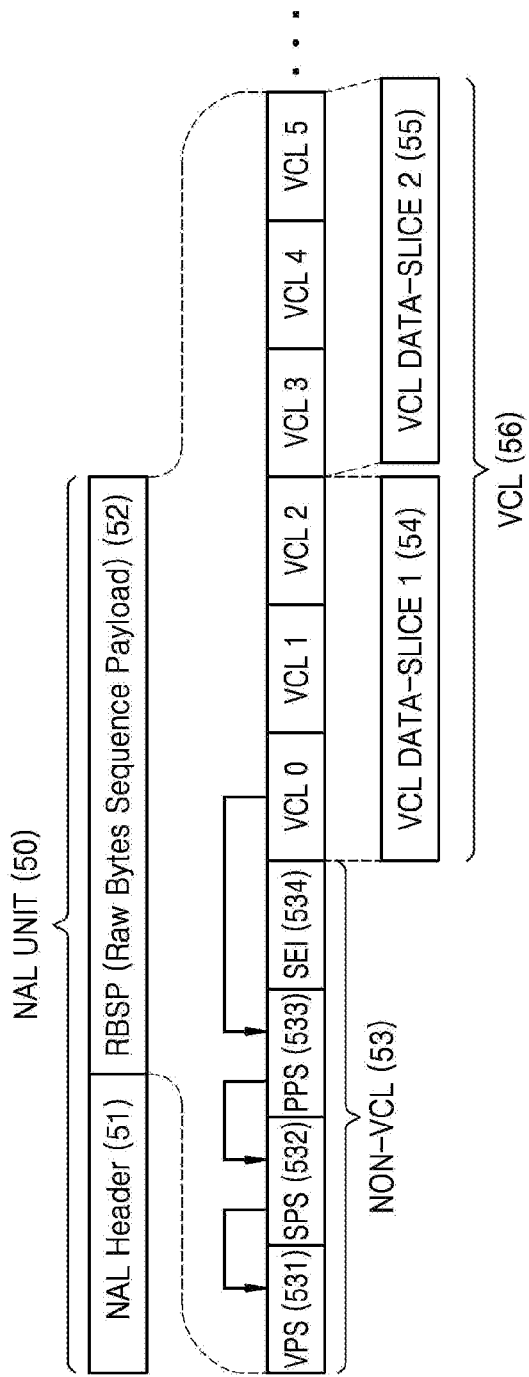
FIG. 7A is a diagram of a structure of a network abstract layer (NAL) unit.

FIG. 7A is a diagram of a structure of a network abstract layer (NAL) unit 50.

The video stream encoding apparatus 10 may encapsulate a video stream including encoded data and window related information in the form of the NAL unit 50 in order to configure the video stream to be easily transmitted over a network. The NAL unit 50 includes a NAL header 51 and a raw bytes sequence payload (RBSP) 52.

The RBSP 52 may be classified into a non-video coding layer (VCL) NAL unit 53 and a VCL NAL unit 56. The VCL NAL unit 56 may include a sample value of video data and encoding data of the sample value. The non-VCL NAL unit 53 may include a parameter set including parameters related to video data recorded on the VCL NAL unit 56, time information, or additional data.

In more detail, the non-VCL NAL unit 53 may include a VPS 531, an SPS 532, a picture parameter set (PPS) 533, and an SEI message 534. The VPS 531 may include parameters for decoding entire video sequences like a whole characteristic regarding currently encoded video sequences. The SP 532 may include parameters for decoding a current video sequence. The PPS 533 may include parameters for decoding a current picture. The SEI message 534 may include additional information or time information that is useful for increasing a video decoding functionality but is not necessary for decoding.

The VCL NAL unit 56 may include actual encoded data of slices like the VCL NAL units 54 including encoding data of a slice 1 and the VCL NAL units 55 including encoding data of a slice 2.

A set of the SPS 532, the PPS 533, the SEI message 534, and the VCL NAL unit 56 indicate one video sequence, e.g., a video stream of a single layer. The SPS 532 may refer to one or more parameters of the VPS 531. The PPS 533 may refer to one or more parameters of the SPS 532. The VCL NAL unit 56 may refer to one or more parameters of the PPS 533.

For convenience of description, the NAL unit 50 of FIG. 4 includes the set of the SPS 532 of a lower level of the VPS 531, the PPS 533, the SEI message 534, and the VCL NAL unit 56. However, if video sequences of a plurality of layers are allocated to the lower level of the VPS 531, an SPS, a PPS, an SEI message, and a VCL NAL unit for a different video sequence may be continued after the VCL NAL unit 56.

The video stream decoding apparatus 10 may generate the NAL unit 50 further including a VPS extension area for recording additional information that is not recorded on the VPS 531. The video stream decoding apparatus 10 may obtain RAP reference layer number information, non-RAP reference layer number information, RAP reference layer identification information, non-RAP reference layer identification information, and multiple standard use information from the VPS extension area.

FIGS. 7B and 7C are diagrams of a syntax of a VPS extension according to various exemplary embodiments.

A syntax "vps_extension" 60 of the VPS extension according to an exemplary embodiment may set a syntax "for" by as many as the number of layers encoded in a current video by using a maximum layer identification number "vps_max_layers_minus1" regarding a current VPS.

View identification information "view_id" indicating a view of a video encoded in a current layer among a multi-view video may be determined for each layer by using the syntax "for". Reference layer relating information of a current layer RAP/non-RAP image may be determined for each layer by using the syntax "for".

According to the syntax "vps_extension" 60, only in a case 62 where the current layer is not a base layer, may information "num_direct_ref_layers_rap" 63 indicating the number of layers directly referred to by the current layer RAP image and information "num_direct_ref_layers_non_rap" 64 indicating the number of layers directly referred to by the current layer non-RAP image be designated.

Identification information "ref_layer_id_rap" 65 for layers directly referred to by a RAP image may be allocated by as many as the number of layers directly referred to by the current layer RAP image. The identification information "ref_layer_id_rap" 65 for reference layers of a current layer image may be an index of a sub set for the RAP image among reference image sets for inter-view prediction.

Likewise, identification information "ref_layer_id_non_rap" 66 for layers directly referred to by a non-RAP image may be allocated by as many as the number of layers directly referred to by the current layer non-RAP image. The identification information "ref_layer_id_rap" 65 for reference layers of the current layer image may be an index of a sub set for the non-RAP image among inter-view reference image sets.

Therefore, the video stream decoding apparatus 20 may read the number of reference layers of RAP images and non-RAP images of the current video and reference layer identification information from the syntax "vps_extension" 60. According to a reading result, the video stream decoding apparatus 20 may perform inter-view compensation by determining correct reference layers of RAP images and non-RAP images for each layer.

A syntax "vps_extension" 67 of the VPS extension according to another exemplary embodiment may include information "multi_standard_flag" 68 indicating whether two or more video encoding standard methods may be allocated in a current video stream.

If two or more video encoding standard methods are allowed according to "multi_standard_flag" 68, information "profile_level_for_nonHEVC" 69 regarding a profile and a level of a standard method other than a basic standard method that is HEVC may be designated.

Thus, the video stream decoding apparatus 20 may read whether a video encoding standard method other than HEVC in the current video is used from "multi_standard_flag" 68 of the syntax "vps_extension" 67. According to a reading result, the video stream decoding apparatus 20 may determine whether to decode or be able to decode the current video stream. If the video stream decoding apparatus 20 determines that the current video stream is decoded, the video stream decoding apparatus 20 may initialize a decoding method of a decoder for each layer and may allocate received layer streams to a correct decoder.

The video stream encoding apparatus 10 of FIG. 1A may perform intra prediction, inter prediction, inter layer prediction, transformation, and quantization for each respective image block to generate samples and may perform entropy encoding on the samples to output the samples in the form of a bitstream. As a video encoding result of the video stream encoding apparatus 10, the video stream encoding apparatus 10 may cooperatively interact with an internal video encoding processor installed therein or an external video encoding processor in order to output a base layer video stream and an improvement layer video stream, and thus, a video encoding process including transformation and quantization may be performed. The internal video encoding processor of the video stream encoding apparatus 10 may be embodied by adding a video encoding processing module to a video encoding device, a central operating device, or a graphic operating device as well as to a separate processor, which performs a basic video encoding operation.

The video stream decoding apparatus 20 of FIG. 2A may decode the received base layer video stream and improvement layer video stream. That is, inverse quantization, inverse transformation, intra prediction, and motion compensation (or inter-view motion compensation or inter layer disparity compensation) may be performed on the base layer video stream and the improvement layer video stream for each respective image block to restore samples of base layer images from the base layer video stream and to restore samples of improvement layer images from the improvement layer video stream. In order to output a restoration image generated as a decoding result of the video stream decoding apparatus 20, the video stream decoding apparatus 20 may cooperatively interact with an internal video encoding processor installed therein or an external video decoding processor, and thus, a video restoring operation including inverse quantization, inverse transformation, and prediction/restoration may be performed. The internal video decoding processor of the video stream decoding apparatus 20 may be embodied by adding a video decoding processing module to a multi-view video restoring terminal, a central operating device, or a graphic operating device as well as to a separate processor, which performs a basic video restoring operation.

As described above, in the video stream encoding apparatus 10 and the video stream decoding apparatus 20, blocks obtained by splitting video data are split into coding units according to a tree structure, and coding units, prediction units, and transformation units are used for inter-layer prediction or inter prediction for a coding unit. Hereinafter, with reference to FIGS. 8 through 20, a method and apparatus for encoding a video and a method and apparatus for decoding a video, based on a coding unit and a transformation unit according to a tree structure, will be described.

In principle, during encoding or decoding for multi-layer video, encoding or decoding processes for base layer images and encoding or decoding processes for improvement layer images are separately performed. That is, when inter-layer prediction is performed on a multi-layer video, encoding or decoding results of a single-layer video are referred to each other, but separate encoding or decoding processes are performed for respective single-layer videos.

For convenience of description, since a video encoding process and a video decoding process based on a coding unit according to a tree structure, which will be described with reference to FIGS. 8 through 20, may be performed on a single-layer video, only inter prediction and motion compensation will be described. However, as described with reference to FIGS. 1A through 7B, inter-layer prediction and compensation between base layer images and improvement layer images are performed to encode or decode a video stream.

Figure 8:
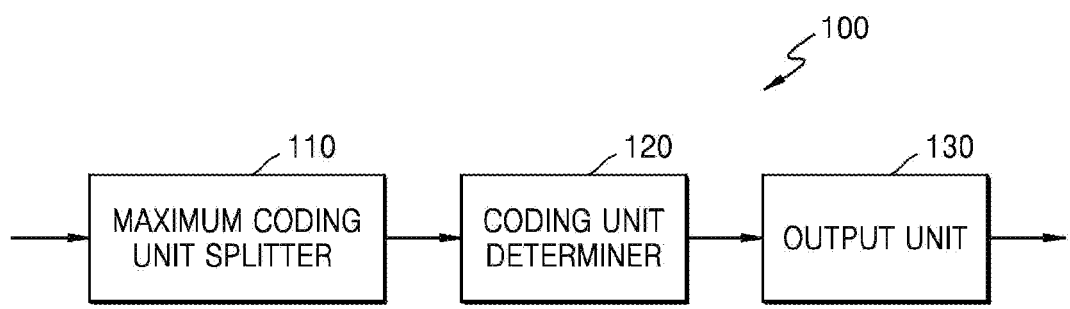
FIG. 8 is a block diagram of a video encoding apparatus configured to perform an encoding operation based on coding units having a tree structure according to an exemplary embodiment.

When the inter-layer encoder 12 of the video stream encoding apparatus 10 encodes a multi-layer video based on a coding unit according to a tree structure, in order to encode a video for each respective single-view video, the video stream encoding apparatus 10 includes as many video encoding apparatuses 100 of FIG. 8 as the number of layers of the multi-layer video in order to encode a video such that each video encoding apparatus 100 may be controlled to encode an assigned single-layer video. In addition, the video stream encoding apparatus 10 may perform inter-view prediction by using the encoding results of separate single-views of each video encoding apparatus 100. Thus, the inter-layer encoder 12 of the video stream encoding apparatus 10 may generate a base layer video stream and an improvement layer video stream, in which the encoding results for respective layers are recorded, for each respective hierarchy.

Figure 9:
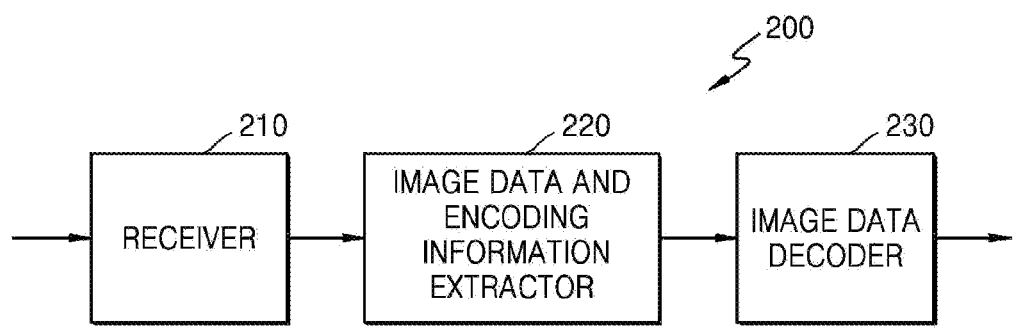
FIG. 9 is a block diagram of a video decoding apparatus configured to perform a decoding operation based on coding units having a tree structure according to an exemplary embodiment.

Similarly, when the video stream decoding apparatus 20 according to an exemplary embodiment decodes a multi-layer video based on a coding unit according to a tree structure, in order to decode the received base layer video stream and improvement layer video stream for each respective layer, the video stream decoding apparatus 20 may include as many video decoding apparatuses 200 of FIG. 9 as the number of layers of the multi-view video and the video decoding apparatuses 200 may be controlled to perform decoding on single-layer videos that are respectively assigned to the video decoding apparatuses 200. In addition, the video stream decoding apparatus 20 may perform inter-view compensation by using the decoding result of separate single-layers of each of the video decoding apparatuses 200. Thus, the inter-layer decoder 24 of the video stream decoding apparatus 20 may generate base layer images and improvement layer images, which are restored for respective layers.

FIG. 8 is a block diagram of a video encoding apparatus 100 configured to perform an encoding operation based on a coding unit according to a tree structure, according to an exemplary embodiment.

The video encoding apparatus 100 configured to perform video prediction based on a coding unit according to a tree structure includes a maximum coding unit splitter 110, a coding determiner 120 and an output unit 130. Hereinafter, for convenience of description, the video encoding apparatus 100 that uses video prediction based on a coding unit according to a tree structure may be referred to as 'the video encoding apparatus 100'.

The maximum coding unit splitter 110 may split a current picture based on a maximum coding unit for the current picture. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output finally encoded image data according to the at least one split region. In other words, the coding unit determiner 120 determines a coded depth by encoding the image data in the deeper coding units according to depths, according to the maximum coding unit of the current picture, and selects a depth having the least encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split into regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times splitting is performed from a maximum coding unit to a minimum coding unit. A first maximum depth according to an exemplary embodiment may denote the total number of times splitting is performed from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to a method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding on the maximum coding unit, the prediction encoding may be performed based on a coding unit corresponding to a coded depth, e.g., based on a coding unit that is no longer split into coding units corresponding to a lower depth. Hereinafter, the coding unit that is no longer split and becomes a basis unit for prediction encoding may also be referred to as a 'prediction unit'. A partition obtained by splitting the prediction unit may include a prediction unit or a data unit obtained by splitting at least one of a height and a width of the prediction unit. The partition is a data unit obtained by dividing the prediction unit of the coding unit and the prediction unit may be a partition having the same size as the coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least (e.g., smallest) encoding error.

The video encoding apparatus 100 may also perform the transformation on the image data in a coding unit based not only on the coding unit for encoding the image data, but also based on a transformation unit that is different from the coding unit. In order to perform the transformation in the coding unit, the transformation may be performed based on a data unit having a size smaller than or equal to the coding unit. For example, the transformation unit for the transformation may include a transformation unit for an intra mode and a data unit for an inter mode.

Similarly to the coding unit according to the tree structure according to the present exemplary embodiment, the transformation unit in the coding unit may be recursively split into smaller sized regions and residual data in the coding unit may be divided according to the transformation having the tree structure according to transformation depths.

According to an exemplary embodiment, the transformation unit of the coding unit is obtained by splitting the height and width of the coding unit and a transformation depth indicating the number of times splitting is performed may also be set in the transformation unit. For example, when the size of a transformation unit of a current coding unit is 2N×2N, a transformation depth may be set to 0. When the size of a transformation unit is N×N, the transformation depth may be set to 1. In addition, when the size of the transformation unit is N/2×N/2, the transformation depth may be set to 2. That is, the transformation unit according to the tree structure may also be set according to the transformation depth.

Encoding information according to coding units corresponding to a coded depth requires not only information about the coded depth, but also information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units and a prediction unit or partition according to a tree structure in a maximum coding unit, and a method of determining a transformation unit, according to exemplary embodiments, will be described in detail later with reference to FIGS. 10 through 20.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to the coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit having a maximum size, which is included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Also, information about a maximum size of the coding unit defined according to pictures, slices, or GOPs, and information about a maximum depth may be inserted into a header of a bitstream, a sequence parameter set (SPS) or a picture parameter set (PPS).

In addition, information about a maximum size of a transformation unit and information about a minimum size of a transformation unit, which are acceptable for a current video, may also be output via a header of a bitstream, an SPS or a PPS. The output unit 130 may encode and output reference information, prediction information, and information about a slice type, which are related to prediction.

In the video encoding apparatus 100, the deeper coding unit may be a coding unit obtained by dividing a height or width of a coding unit of an upper depth, which is one level higher than the current depth, by two. In other words, when the size of the coding unit of the current depth is 2N×2N, the size of the coding unit of the lower depth is N×N. Also, the coding unit of the current depth having the size of 2N×2N may include a maximum value 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or a large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The video stream encoding apparatus 10 described with reference to FIG. 1A may include as many video encoding apparatuses 100 as the number of layers in order to encode single-layer images for respective layers of a multi-layer video. For example, the inter-layer encoder 12 may include a single video encoding apparatus 100 and the bitstream generator 14 may include as many video encoding apparatuses 100 as the number of additional views.

When the video encoding apparatus 100 encodes base layer images, the coding determiner 120 may determine a prediction unit for inter prediction for each respective coding unit according to a tree structure for each maximum coding unit and may perform inter prediction for each respective prediction unit.

When the video encoding apparatus 100 encodes improvement layer images, the coding determiner 120 may also determine a prediction unit and a coding unit according to a tree structure for each maximum coding unit and may perform inter prediction for each respective prediction unit.

FIG. 9 is a block diagram of a video decoding apparatus 200 configured to perform a decoding operation based on a coding unit according to a tree structure, according to an exemplary embodiment.

The video decoding apparatus 200 configured to perform a decoding operation based on the coding unit according to the tree structure includes a receiver 210, an image data and encoding information extractor 220, and an image data decoder 230. Hereinafter, for convenience of description, the video decoding apparatus 200 using video prediction based on a coding unit according to a tree structure may also be referred to as the 'video decoding apparatus 200'.

Definitions of various terms, such as a coding unit, a depth, a prediction unit, a transformation unit, and information about various encoding modes, for decoding operations of the video decoding apparatus 200 may be identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, an SPS, or a PPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bitstream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and about a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation. Inverse transformation may be performed according to a method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read transformation unit information according to a tree structure for each coding unit so as to determine transformation units for each coding unit and perform inverse transformation based on transformation units for each coding unit for each maximum coding unit. Via the inverse transformation, a pixel value of a spatial region of the coding unit may be restored.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. For each coding unit determined as described above, information about an encoding mode may be obtained so as to decode the current coding unit.

The inter-layer encoder 12 of the video stream encoding apparatus 10 described with reference to FIG. 1A may include as many image data decoders 230 of the image decoding apparatus 200 as the number of views in order to generate reference images for inter prediction for respective layers of a multi-layer video.

In addition, the decoder 26 of the video stream decoding apparatus 20 described with reference to FIG. 2A may include as many video decoding apparatuses 200 as the number of views in order to decode the received base layer image stream and improvement layer image stream to restore base layer images and improvement layer images.

When a base layer image stream is received, the image data decoder 230 of the video decoding apparatus 200 may split samples of base view images that are extracted from the base view image stream by the extractor 220 into coding units according to a tree structure of a maximum coding unit. The image data decoder 230 may perform motion compensation on respective prediction units for inter prediction for each respective coding unit according to a tree structure of the samples of the base view images, to restore the base view images.

When an improvement layer image stream is received, the image data decoder 230 of the video decoding apparatus 200 may split samples of additional view images that are extracted from the additional layer image stream by the extractor 220 into coding units according to a tree structure of a maximum coding unit. The image data decoder 230 may perform motion compensation on respective prediction units for inter prediction of the samples of the additional view images to restore the additional view images.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of a coding unit is determined considering a resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 10:
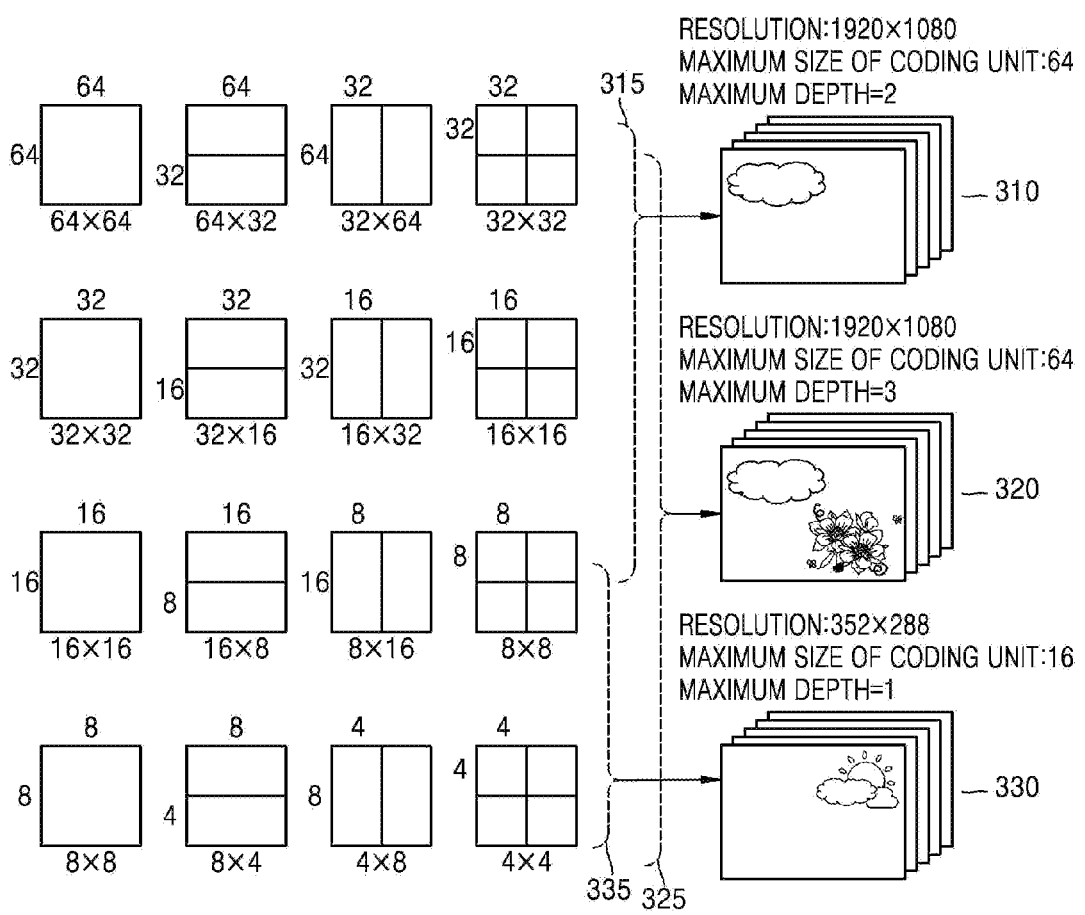
FIG. 10 is a diagram for describing a concept of coding units according to an exemplary embodiment.

FIG. 10 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 11:
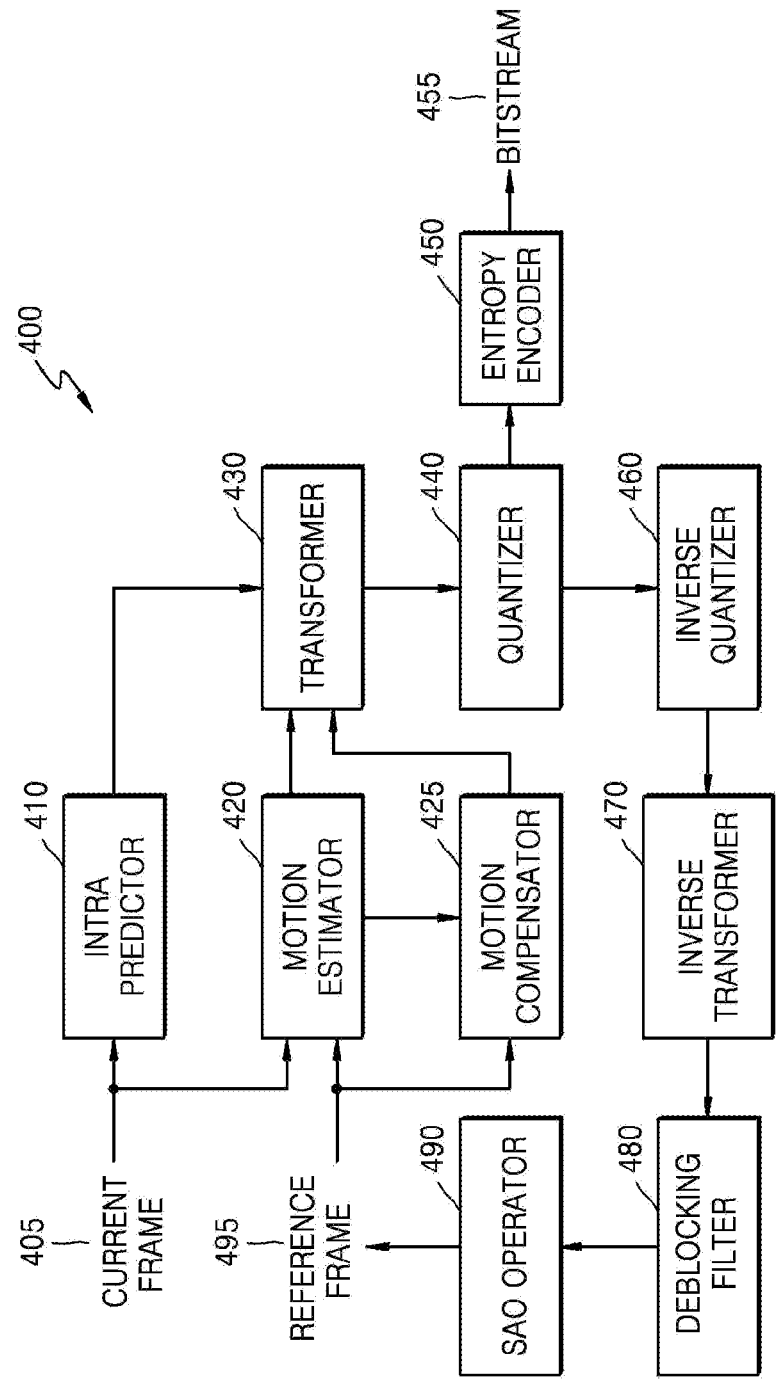
FIG. 11 is a block diagram of an image encoder configured to perform an encoding operation based on coding units according to an exemplary embodiment.

FIG. 11 is a block diagram of an image encoder 400 configured to perform an encoding operation based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405 and a reference frame 495.

Data output from the intra predictor 410, the motion estimator 420, and the motion compensator 425 is output as quantized transformation coefficients through a transformer 430 and a quantizer 440. The quantized transformation coefficients are restored as data in a spatial domain through an inverse quantizer 460 and an inverse transformer 470, and the restored data in the spatial domain is output as the reference frame 495 after being post-processed through a deblocking filter 480 and a sample adaptive offset (SAO)

operator 490 (e.g., a loop filter). The quantized transformation coefficients may be output as a bitstream 455 through an entropy encoder 450.

In order for the image encoder 400 to be implemented in the video encoding apparatus 100, elements of the image encoder 400, e.g., the intra predictor 410, the motion estimator 420, the motion compensator 425, the transformer 430, the quantizer 440, the entropy encoder 450, the inverse quantizer 460, the inverse transformer 470, the deblocking filter 480, and the SAO operator 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 12:
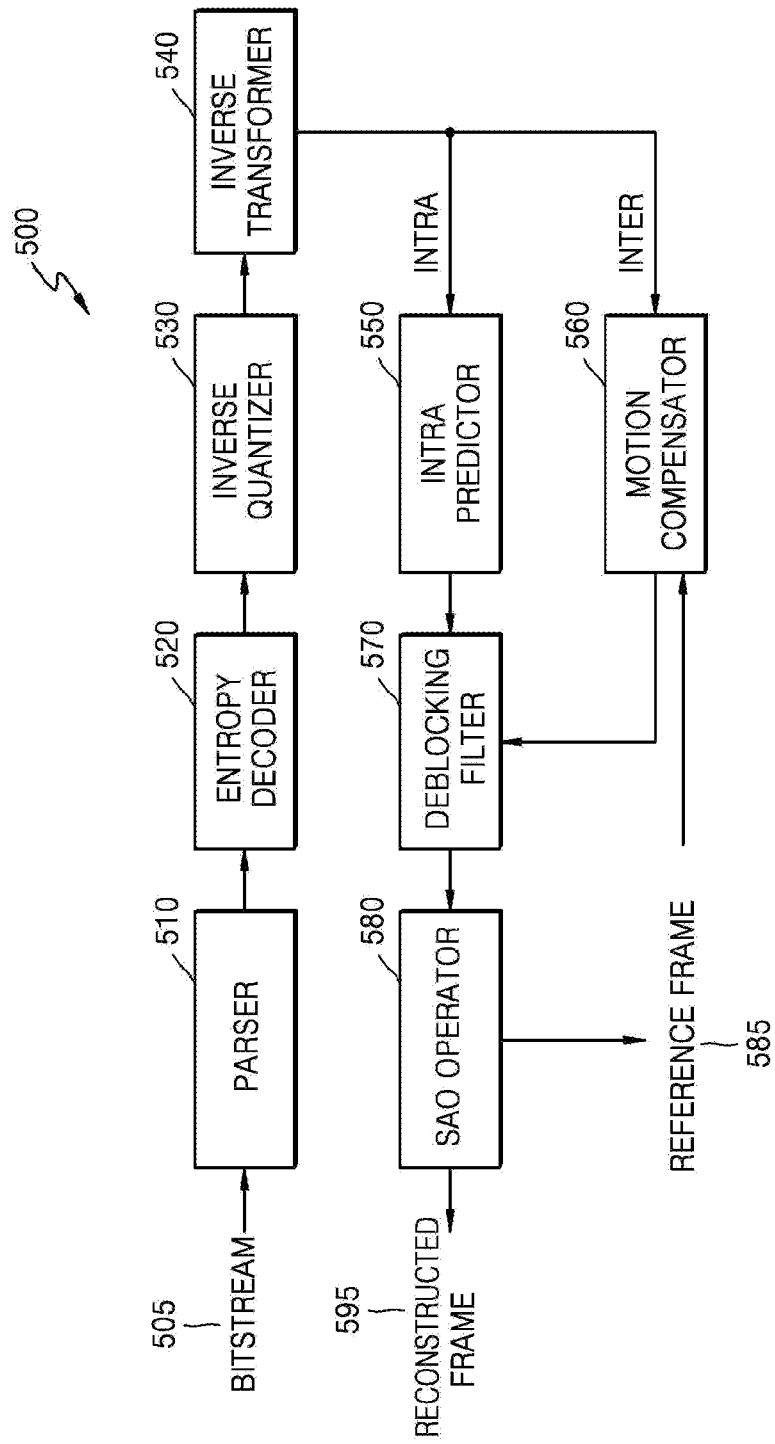
FIG. 12 is a block diagram of an image decoder configured to perform a decoding operation based on coding units according to an exemplary embodiment.

FIG. 12 is a block diagram of an image decoder 500 configured to perform a decoding operation based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a reconstructed frame 595 (e.g., restored frame) after being post-processed through a deblocking filter 570 and an SAO operator 580 (e.g., loop filter). Also, the image data that is post-processed through the deblocking filter 570 and the SAO operator 580 may be output as the reference frame 585.

In order to decode the image data in the image data decoder 230 of the video decoding apparatus 200, the image decoder 500 may perform operations that are performed after the parser 510 performs an operation.

In order for the image decoder 500 to be implemented in the video decoding apparatus 200, elements of the image decoder 500, e.g., the parser 510, the entropy decoder 520, the inverse quantizer 530, the inverse transformer 540, the intra predictor 550, the motion compensator 560, the deblocking filter 570, and the SAO operator 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 performs operations based on a size of a transformation unit for each coding unit.

The encoding operation of FIG. 11 and the decoding operation of FIG. 12 describe in detail a video stream encoding operation and a video stream decoding operation in a single layer, respectively. Thus, if the inter-layer encoder 12 of FIG. 1A encodes a video stream of two or more layers, the image encoder 400 may be provided for each layer. Similarly, if the inter-layer decoder 24 of FIG. 2A decodes a video stream of two or more layers, the image decoder 500 may be provided for each layer.

Figure 13:
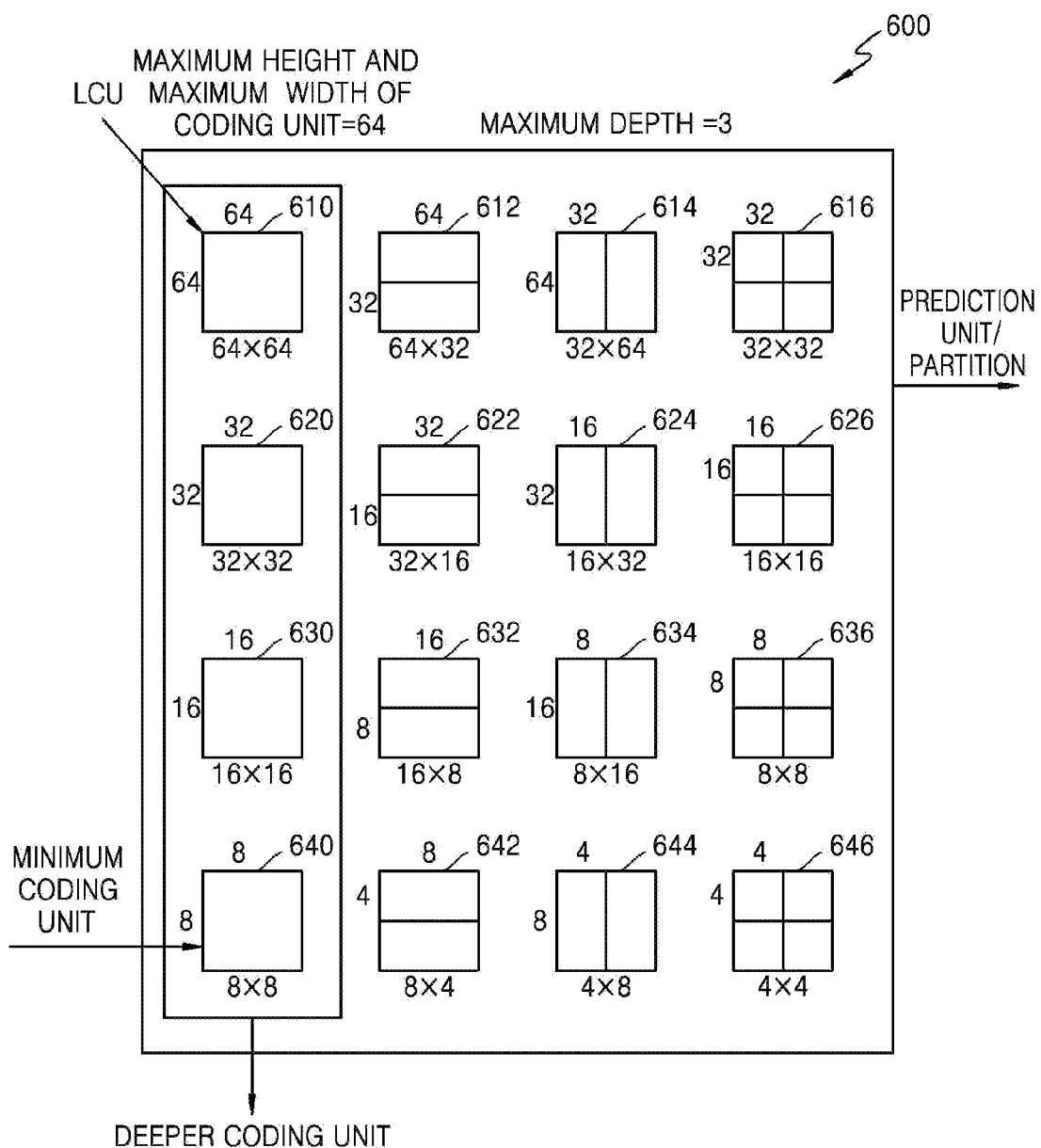
FIG. 13 is a diagram illustrating deeper coding units according to depths, and partitions according to an exemplary embodiment.

FIG. 13 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. In this case, the maximum depth refers to a total number of times the coding unit is split from the maximum coding unit to the minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, e.g., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 exist. The coding unit 640 having the size of 8×8 and the depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, e.g., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, e.g., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, e.g., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 640 having the size of 8×* and the depth of 3 is the minimum coding unit and a coding unit of the lowermost depth.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 14:
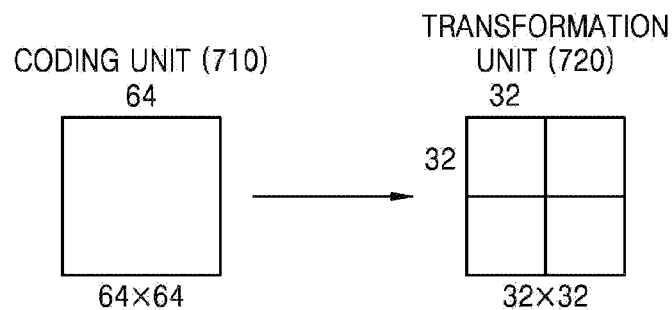
FIG. 14 is a diagram for describing a relationship between a coding unit and transformation units, according to an exemplary embodiment.

FIG. 14 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 15:
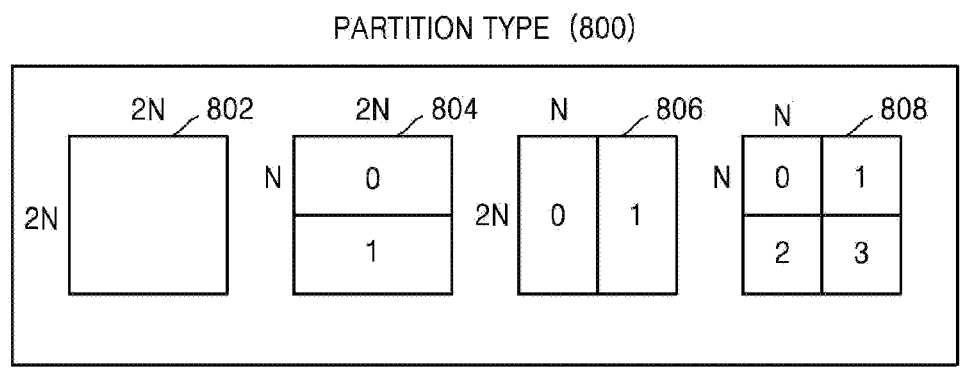
FIG. 15 is a diagram for describing encoding information of coding units corresponding to a coded depth, according to an exemplary embodiment.
Figure 15:
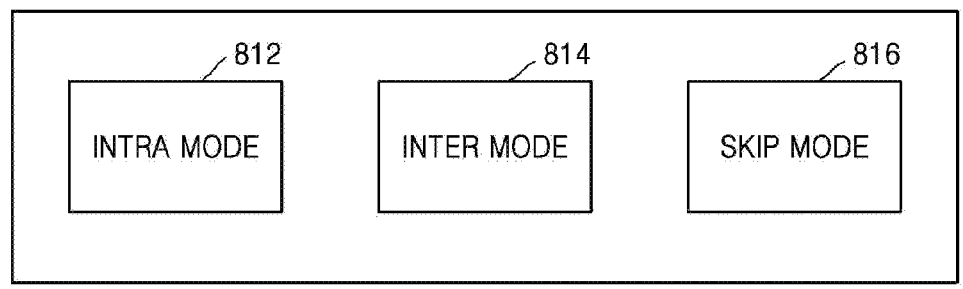
Figure 15:
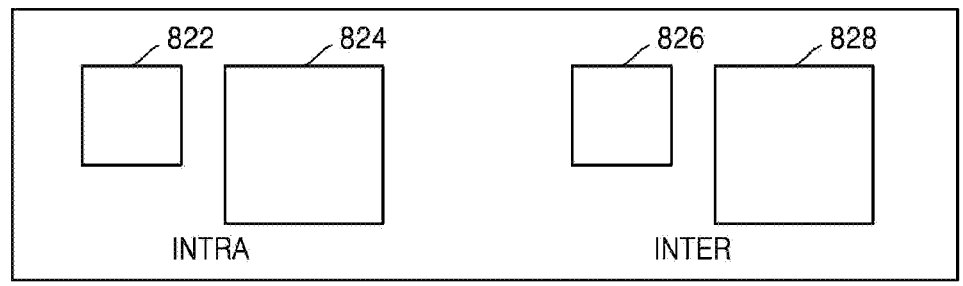

FIG. 15 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode. The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, e.g., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 16:
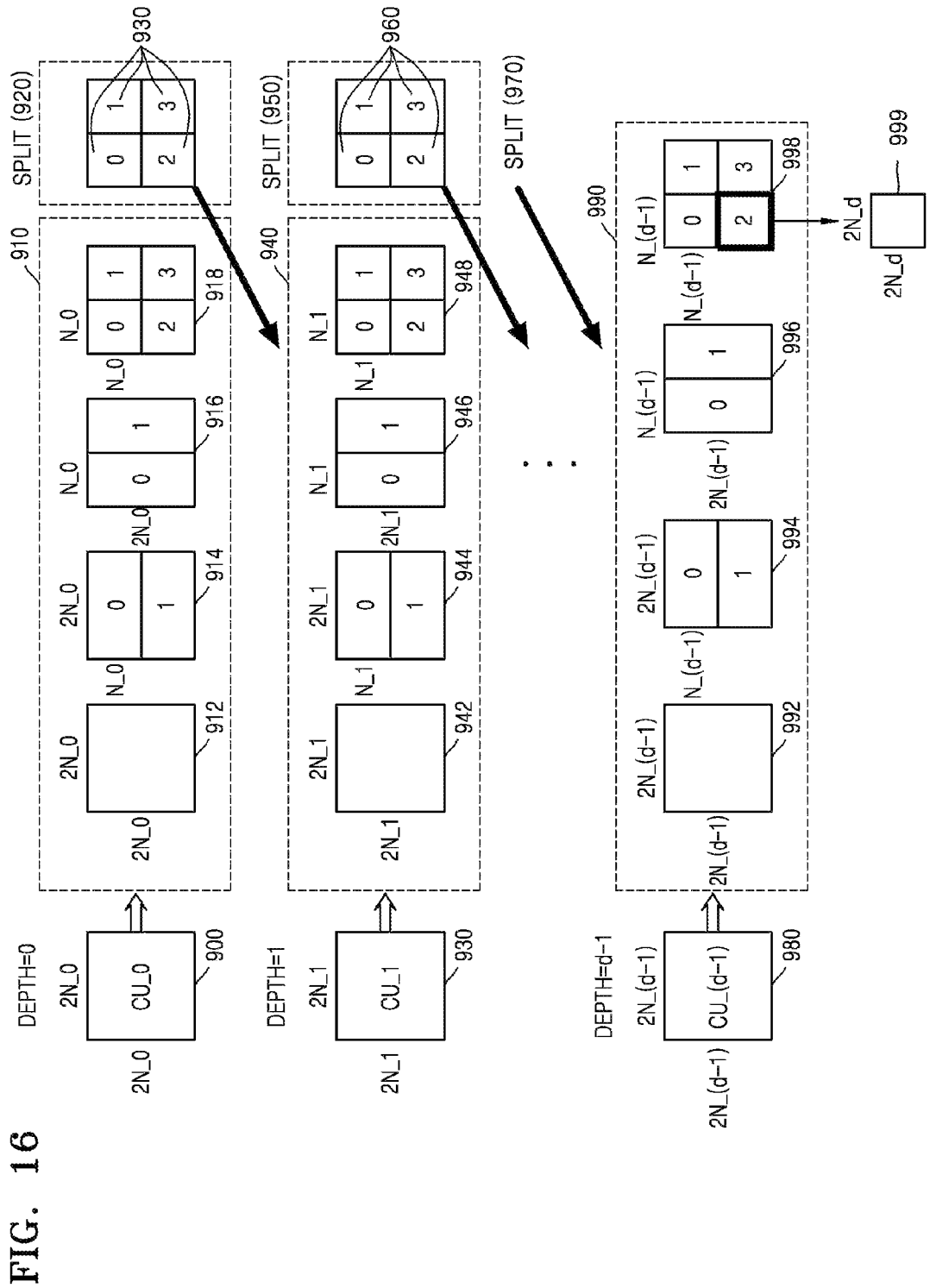
FIG. 16 is a diagram of deeper coding units according to depths, according to an exemplary embodiment.

FIG. 16 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 16 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed until a depth becomes d−1, and split information may be encoded for up to when a depth is one of 0 to d−2. In other words, when encoding is performed until the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 17:
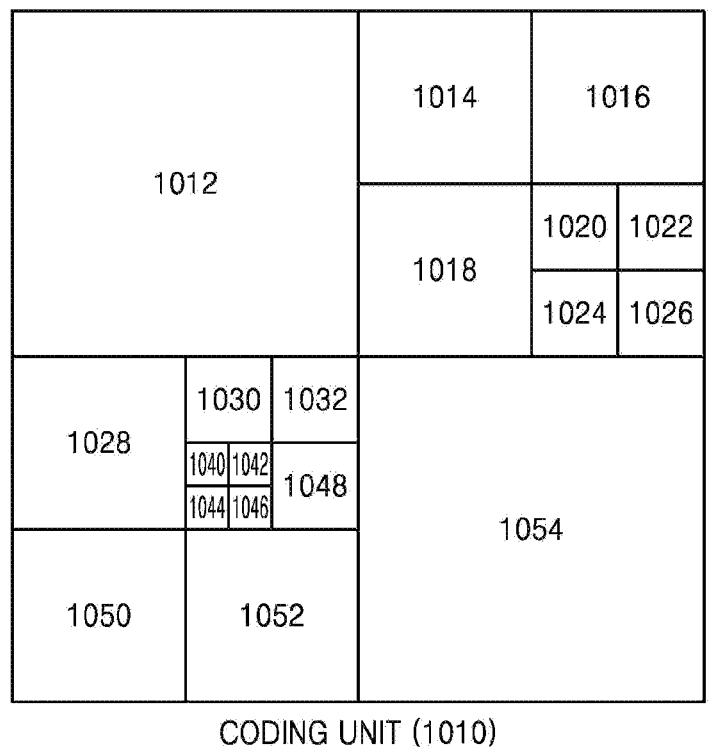
FIGS. 17, 18 and 19 are diagrams for describing a relationship between coding units, prediction units, and transformation units, according to an exemplary embodiment.
Figure 18:
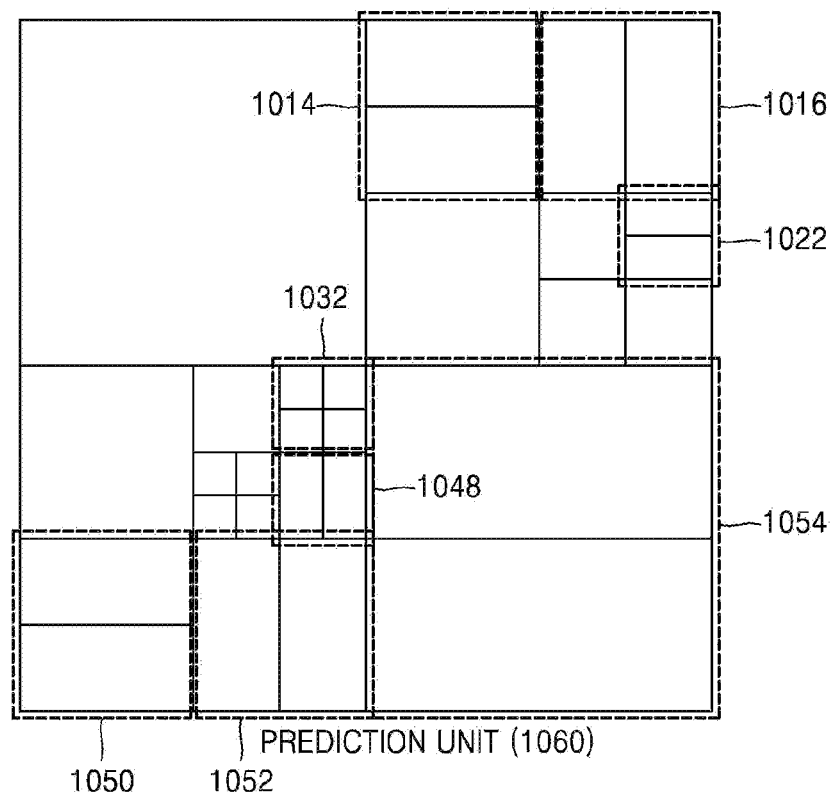
Figure 19:
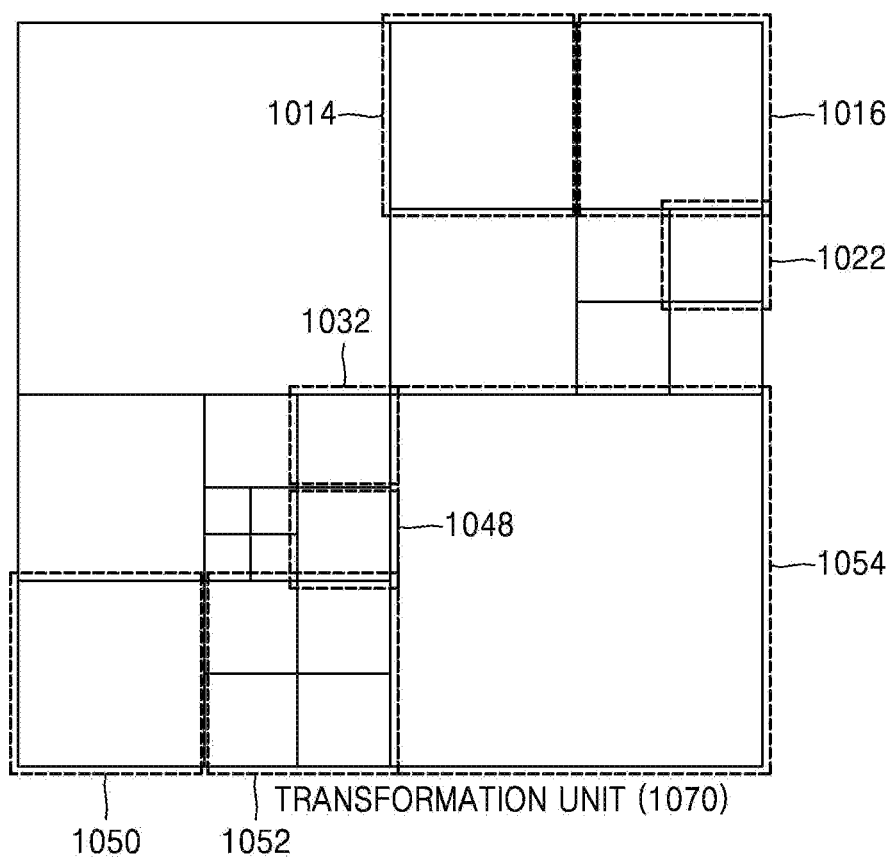

FIGS. 17, 18 and 19 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| | | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Intra Inter Skip | 2N × 2N 2N × N N × 2N | 2N × nU 2N × nD nL × 2N | 2N × 2N | N × N (Symmetrical Type) | Repeatedly Encode Coding |

Split Information 0 (Encoding on Coding Unit having Size of 2N × 2N and Current Depth of d)

TABLE 1-continued

Split Information 0 (Encoding on Coding Unit having Size of 2N × 2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| (Only 2N × 2N) | N × N | nR × 2N | | N/2 × N/2 (Asymmetrical Type) | Units having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 20:
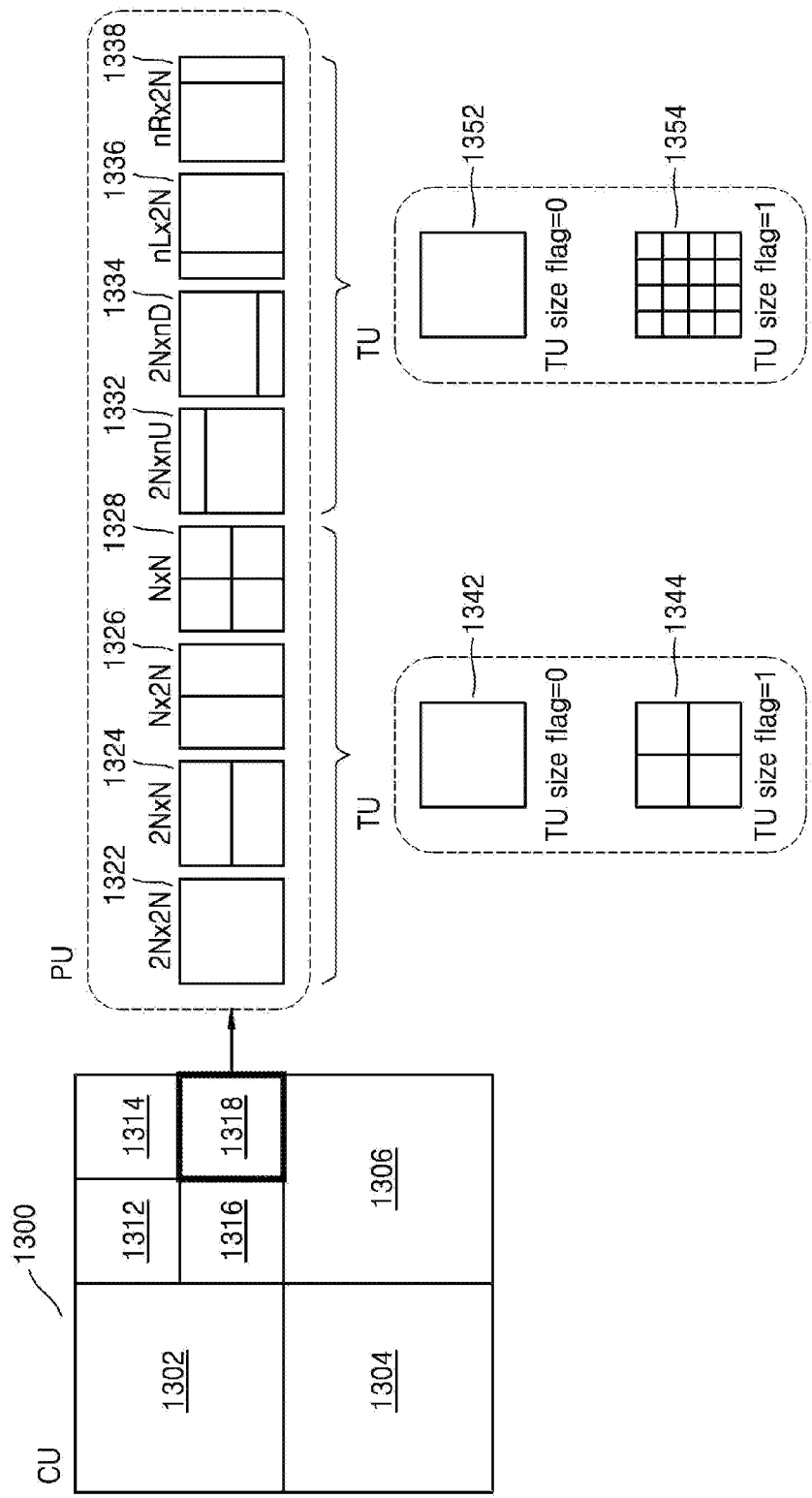
FIG. 20 is a diagram for describing a relationship between a coding unit, a prediction unit or a partition, and a transformation unit, according to encoding mode information of Table 1.

FIG. 20 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU (Transformation Unit)size flag) of a transformation unit is a type of a transformation index. The size of the transformation unit corresponding to the transformation index may be changed according to a prediction unit type or partition type of the coding unit.

For example, when the partition type is set to be symmetrical, e.g., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, e.g., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. A result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad \text{Equation (1)}$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad \text{Equation (2)}$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad \text{Equation (3)}$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the exemplary embodiments are not limited thereto.

According to the video encoding method based on coding units having a tree structure as described with reference to FIGS. 8 through 20, image data of a spatial region is encoded for each coding unit of a tree structure. According to the video decoding method based on coding units having a tree structure, decoding is performed for each maximum coding unit to restore image data of a spatial region. Thus, a picture and a video that is a picture sequence may be restored. The restored video may be reproduced by a reproducing apparatus, stored in a storage medium, or transmitted through a network.

The exemplary embodiments may be written as computer programs and may be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

For convenience of description, a video stream encoding method and/or a video encoding method, which has been described with reference to FIGS. 1A through 20, may also be collectively referred to as a 'video encoding method according to an exemplary embodiment'. In addition, the video stream decoding method and/or the video decoding method, which has been described with reference to FIGS. 1A through 20, may also be referred to as a 'video decoding method according to an exemplary embodiment'.

A video encoding apparatus including the video stream encoding apparatus 10, the video encoding apparatus 100, or the image encoder 400, which has been described with reference to FIGS. 1A through 20, may also be referred to as a 'video encoding apparatus according to an exemplary embodiment'. In addition, a video decoding apparatus including the video stream decoding apparatus 20, the video decoding apparatus 200, or the image decoder 500, which has been described with reference to FIGS. 1A through 20, may also be referred to as a 'video decoding apparatus according to an exemplary embodiment'.

A computer readable recording medium storing a program, e.g., a disc 260000, according to an exemplary embodiment will now be described in detail.

Figure 21:
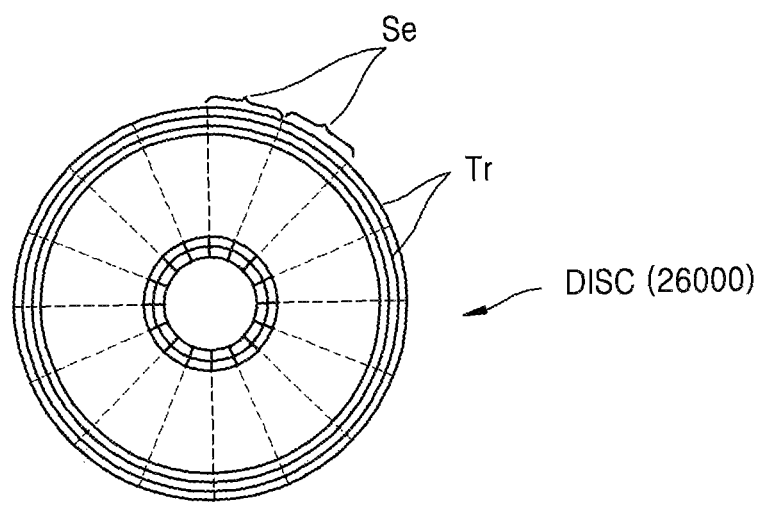
FIG. 21 illustrates a physical structure of a disc that stores a program, according to an exemplary embodiment.

FIG. 21 illustrates a physical structure of a disc 26000 that stores a program, according to an exemplary embodiment. The disc 26000 which is a storage medium may be a hard drive, a compact disc-read only memory (CD-ROM) disc, a Blu-ray disc, or a digital versatile disc (DVD). The disc 26000 includes a plurality of concentric tracks Tr each being divided into a specific number of sectors Se in a circumferential direction of the disc 26000. In a specific region of the disc 26000, a program that executes a method of determining a quantization parameter, a video encoding method, and a video decoding method as described above may be assigned and stored.

A computer system embodied using a storage medium that stores a program for executing a video encoding method and a video decoding method as described above will now be described with reference to FIG. 22.

Figure 22:
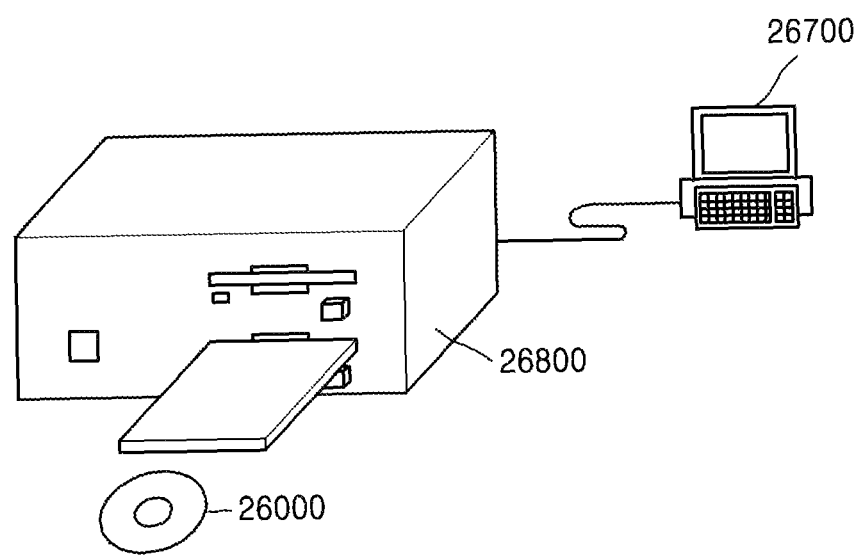
FIG. 22 illustrates a disc drive that records and reads a program by using a disc.

FIG. 22 illustrates a disc drive 26800 that records and reads a program by using a disc 26000. A computer system 26700 may store a program that executes at least one of a video encoding method and a video decoding method according to an exemplary embodiment, in the disc 26000 via the disc drive 26800. To run the program stored in the disc 26000 in the computer system 26700, the program may be read from the disc 26000 and be transmitted to the computer system 26700 by using the disc drive 26800.

The program that executes at least one of a video encoding method and a video decoding method according to an exemplary embodiment may be stored not only in the disc 26000 illustrated in FIGS. 21 and 22 but also in a memory card, a ROM cassette, or a solid state drive (SSD).

A system to which the video encoding method and a video decoding method described above are applied will be described below.

Figure 23:
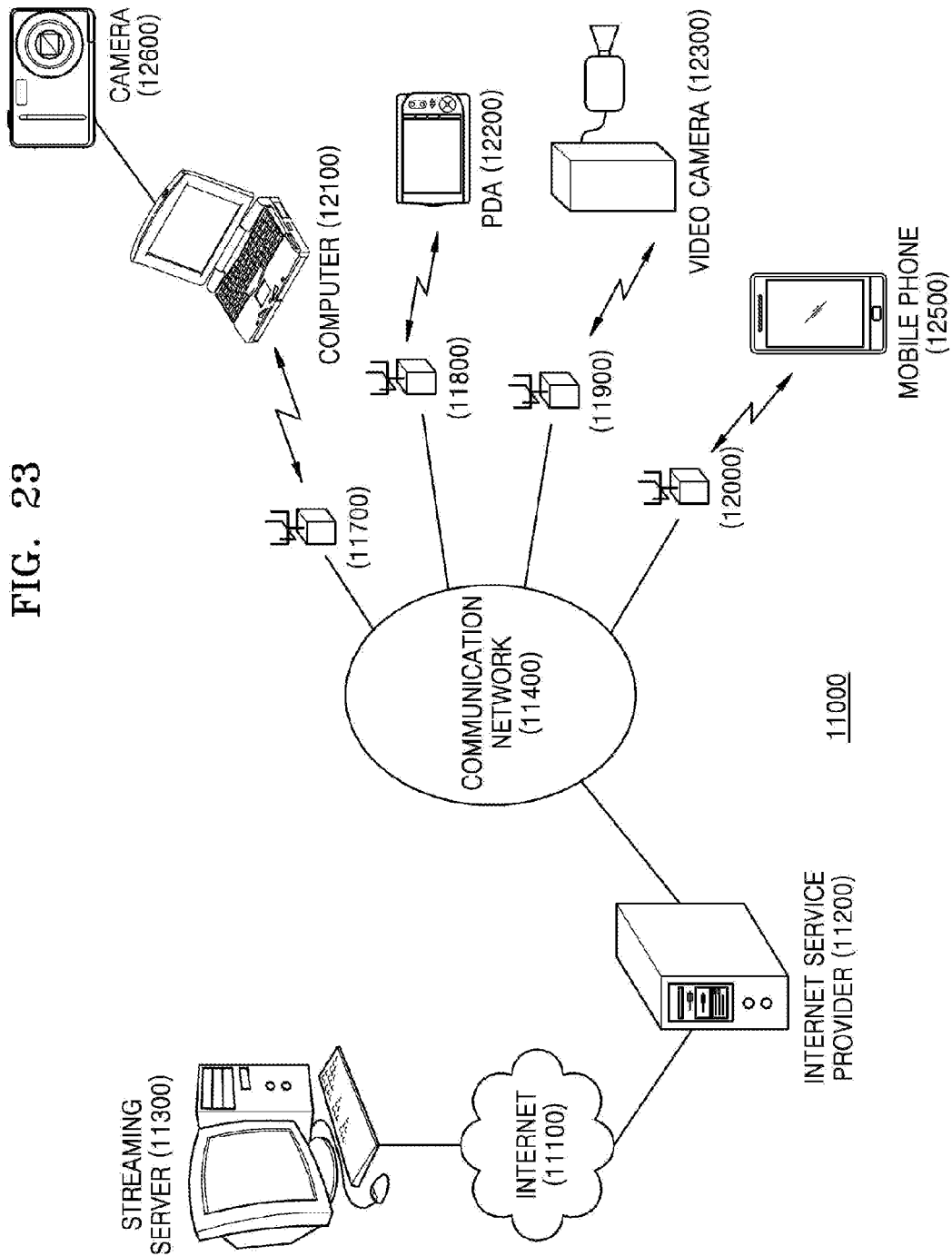
FIG. 23 illustrates an entire structure of a content supply system that provides a content distribution service.

FIG. 23 illustrates a structure of a content supply system 11000 that provides a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
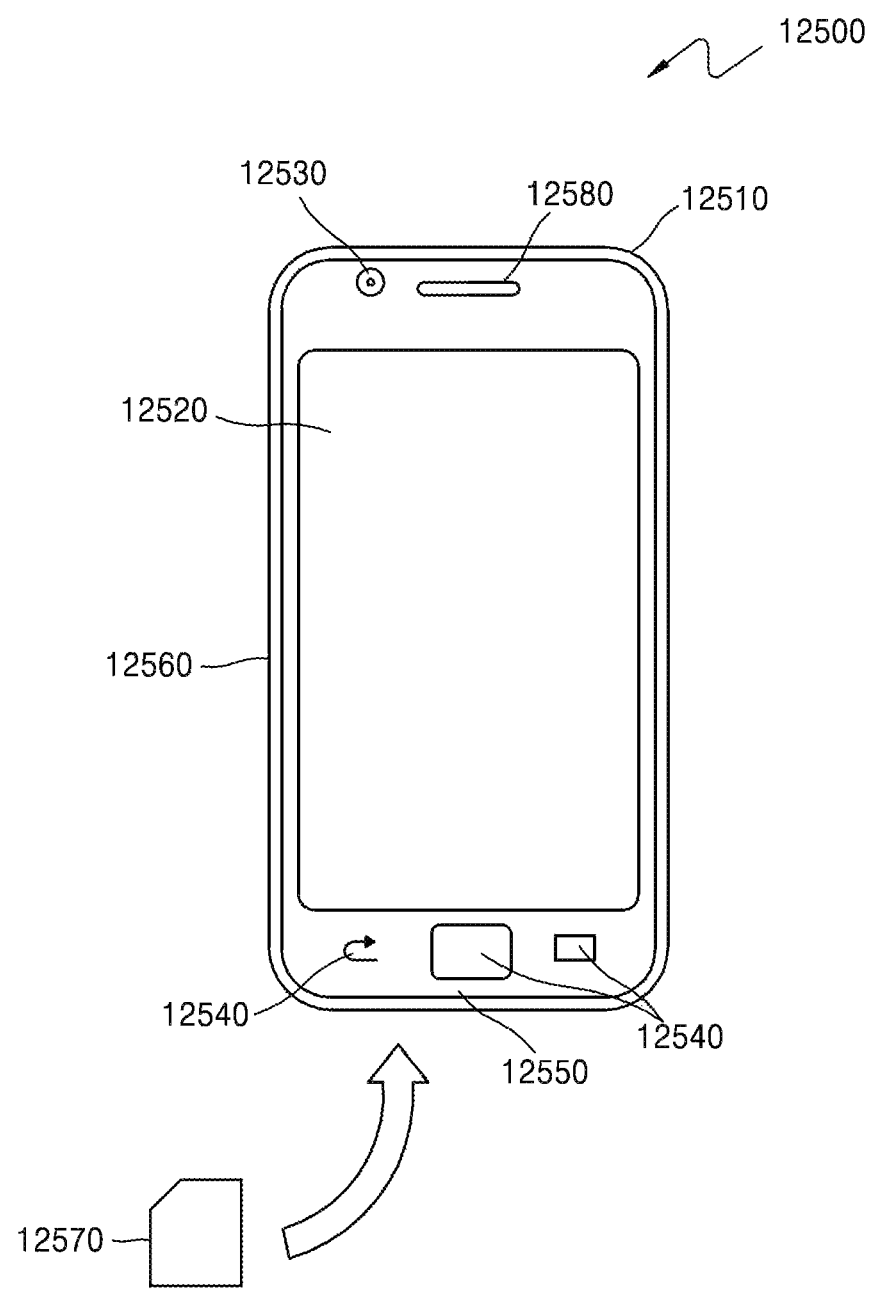
FIGS. 24 and 25 illustrate external and internal structures of a mobile phone to which a video encoding method and a video decoding method are applied, according to an exemplary embodiment.

However, the content supply system 11000 is not limited to the configuration illustrated in FIG. 24, and devices may be selectively connected thereto. The plurality of independent devices may be directly connected to the communication network 11400, rather than via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding of video may be stored in a computer readable recording medium, e.g., a CD-ROM disc, a floppy disc, a hard disc drive, an SSD, or a memory card, which may be accessible by the computer 12100.

If video data is captured by a camera built into the mobile phone 12500, the video data may be received from the mobile phone 12500.

The video data may also be encoded by a large scale integrated circuit (LSI) system installed in the video camera 12300, the mobile phone 12500, or the camera 12600.

According to an exemplary embodiment, the content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data as a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to an exemplary embodiment.

The mobile phone 12500 included in the content supply system 11000 according to an exemplary embodiment will now be described in greater detail with referring to FIGS. 24 and 25.

FIG. 24 illustrates an external structure of a mobile phone 12500 to which a video encoding method and a video decoding method are applied, according to an exemplary embodiment. The mobile phone 12500 may be a smart phone, the functions of which are not limited and a large part of the functions of which may be changed or expanded.

The mobile phone 12500 includes an internal antenna 12510 via which a radio-frequency (RF) signal may be exchanged with the wireless base station 12000 of FIG. 24, and includes a display screen 12520 for displaying images captured by a camera 12530 or images that are received via the antenna 12510 and decoded, e.g., a liquid crystal display (LCD) or an organic light-emitting diodes (OLED) screen. The smart phone 12510 includes an operation panel 12540 including a control button and a touch panel. If the display screen 12520 is a touch screen, the operation panel 12540 further includes a touch sensing panel of the display screen 12520. The smart phone 12510 includes a speaker 12580 for outputting voice and sound or another type sound output unit, and a microphone 12550 for inputting voice and sound or another type sound input unit. The smart phone 12510 further includes the camera 12530, such as a charge-coupled device (CCD) camera, to capture video and still images. The smart phone 12510 may further include a storage medium 12570 for storing encoded or decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
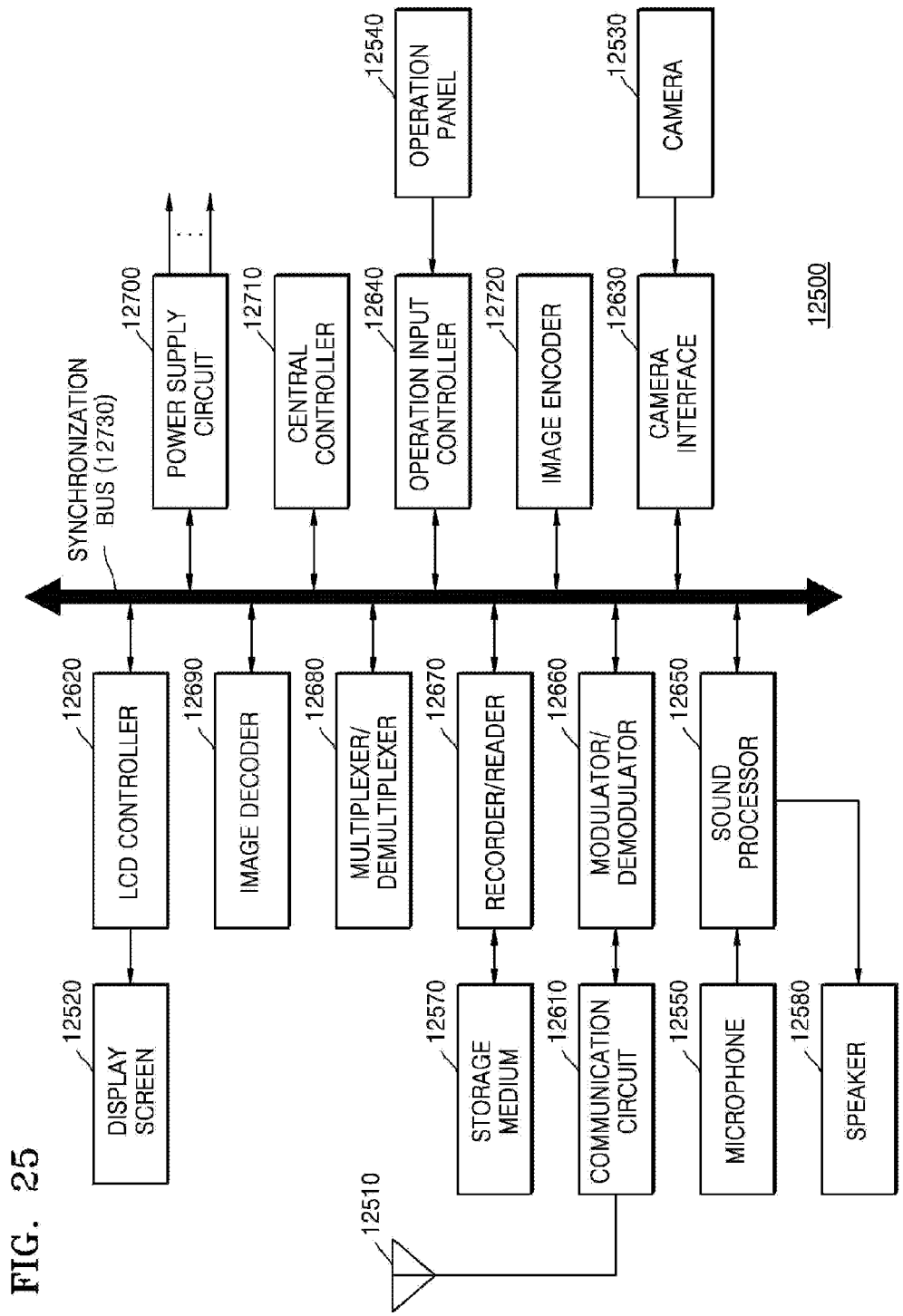

FIG. 25 illustrates an internal structure of the mobile phone 12500, according to an exemplary embodiment. To systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a power on state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a random access memory (RAM).

While the mobile phone 12500 transmits communication data to the outside, a digital signal is generated in the mobile phone 12500 under control of the central controller. For example, the sound processor 12650 may generate a digital sound signal, the image encoder 12720 may generate a digital image signal, and text data of a message may be generated via the operation panel 12540 and the operation input controller 12640. When a digital signal is delivered to the modulator/demodulator 12660 under control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulator/demodulator 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulator/demodulator 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to a structure of the video encoding apparatus 100 described above. The image encoding unit 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be delivered to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulator/demodulator 12660 modulates a frequency band of the digital signal. The frequency-band modulated digital signal is transmitted to the image decoder 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, under control of the central controller 12710.

When in the data communication mode, data of a video file accessed at an Internet website is received, a signal received from wireless base station 12000 via the antenna 12510 is output as multiplexed data via the modulator/demodulator 1266, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the image decoder 12690 and the sound processor 12650, respectively.

A structure of the image decoder 12690 may correspond to a structure of the video decoding apparatus 200 described above. The image decoder 12690 may decode the encoded video data to obtain restored video data and provide the restored video data to the display screen 12520 via the LCD controller 12620, according to the video decoding method described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an exemplary embodiment, may be a transceiving terminal including only the video encoding apparatus, or may be a transceiving terminal including only the video decoding apparatus.

Figure 26:
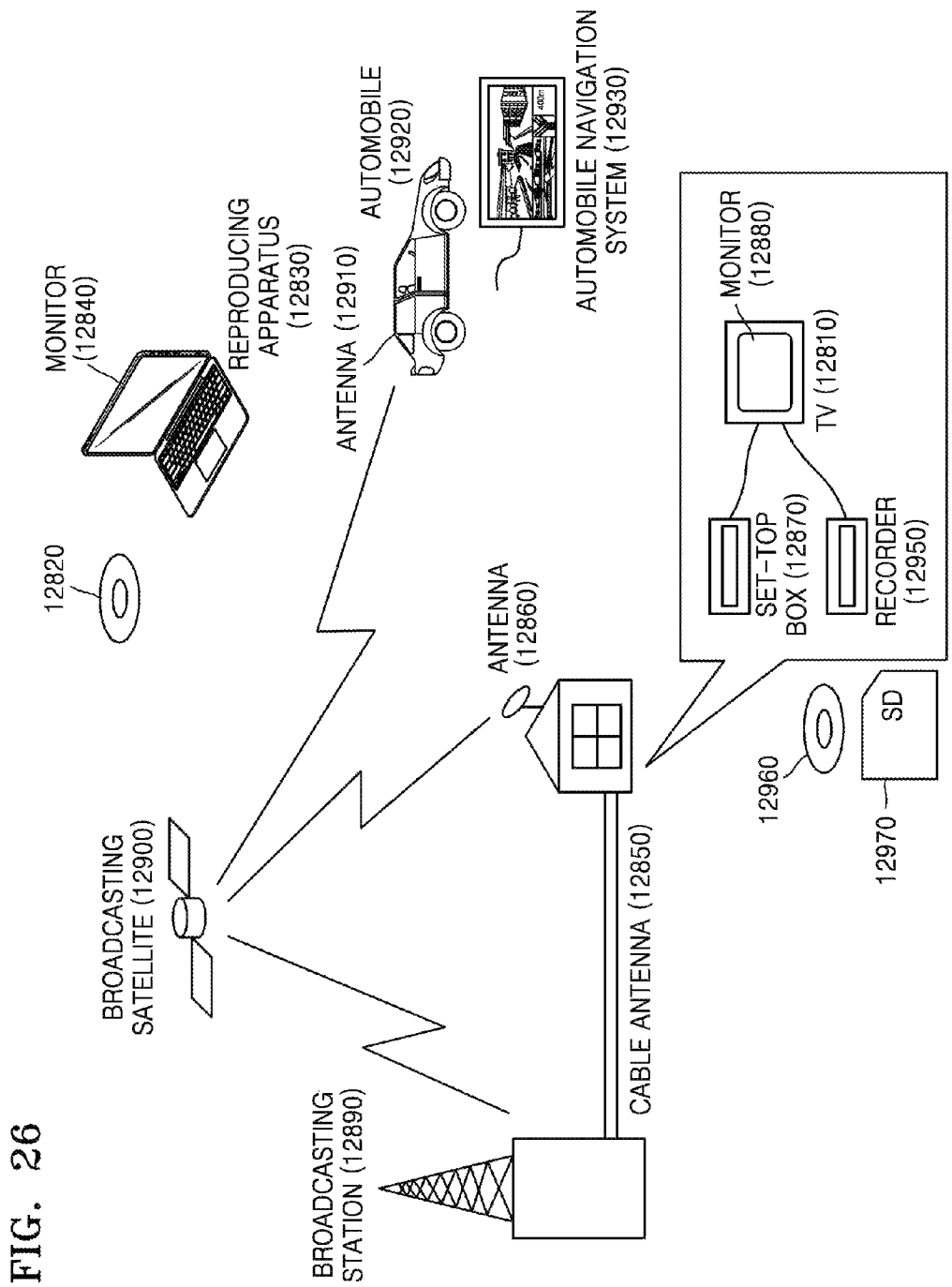
FIG. 26 illustrates a digital broadcasting system employing a communication system, according to an exemplary embodiment.

A communication system according to the exemplary embodiments is not limited to the communication system described above with reference to FIG. 24. For example, FIG. 26 illustrates a digital broadcasting system employing a communication system, according to an exemplary embodiment. The digital broadcasting system of FIG. 26 may receive a digital broadcast transmitted via a satellite or a terrestrial network by using a video encoding apparatus and a video decoding apparatus according to an exemplary embodiment.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an exemplary embodiment is implemented in a reproducing apparatus 12830, the reproducing apparatus 12830 may parse and decode an encoded video stream recorded on a storage medium 12820, such as a disc or a memory card to restore digital signals. Thus, the restored video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to an exemplary embodiment may be installed. Data output from the set-top box 12870 may also be reproduced on a TV monitor 12880.

As another example, a video decoding apparatus according to an exemplary embodiment may be installed in the TV receiver 12810 instead of the set-top box 12870.

An automobile 12920 including an appropriate antenna 12910 may receive a signal transmitted from the satellite 12900 or the wireless base station 11700. A decoded video may be reproduced on a display screen of an automobile navigation system 12930 built into the automobile 12920.

A video signal may be encoded by a video encoding apparatus according to an exemplary embodiment and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 25. For example, the computer 12100 and the TV receiver 12810 may not be included in the camera 12530, the camera interface 12630, or the image encoder 12720 of FIG. 25.

FIG. 27 illustrates a network structure of a cloud computing system using a video encoding apparatus and a video decoding apparatus, according to an exemplary embodiment.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, storage, an operating system (OS), and security, in his or her own terminal in order to use the services, but may select and use desired services from among services in a virtual space generated through the virtualization technology, at a desired point of time.

A user terminal of a specified service user is connected to the cloud computing server 14000 via a data communication network including the Internet and a mobile telecommunication network. User terminals may be provided with cloud computing services, and particularly video reproduction services, from the cloud computing server 14000. The user terminals may be various types of electronic devices capable of being connected to the Internet, e.g., a desk-top PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of the combining. The plurality of computing resources 14200 may include various data services, and may include data uploaded from user terminals. As described above, the cloud computing server 14000 may provide user terminals with desired services by combining video databases distributed in different regions according to the virtualization technology.

User information about users who have subscribed to a cloud computing service is stored in the user DB 14100. The user information may include login information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14100 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14100 may vary according to the request from the user terminal, e.g., according to whether the video will be reproduced, starting from a start thereof or a pausing point thereof. For example, if the user terminal requests to reproduce the video, starting from the start thereof, the cloud computing server 14100 transmits streaming data of the video starting from a first frame thereof to the user terminal. If the user terminal requests to reproduce the video, starting from the pausing point thereof, the cloud computing server 14100 transmits streaming data of the video starting from a frame corresponding to the pausing point, to the user terminal.

In this case, the user terminal may include a video decoding apparatus as described above with reference to FIGS. 1A through 20. As another example, the user terminal may include a video encoding apparatus as described above with reference to FIGS. 1A through 20. Alternatively, the user terminal may include both the video decoding apparatus and the video encoding apparatus as described above with reference to FIGS. 1A through 20.

Various applications of a video encoding method, a video decoding method, a video encoding apparatus, and a video decoding apparatus according to exemplary embodiments described above with reference to FIGS. 1A through 20 have been described above with reference to FIGS. 21 through 27. However, methods of storing the video encoding method and the video decoding method in a storage medium or methods of implementing the video encoding apparatus and the video decoding apparatus in a device according to various exemplary embodiments are not limited to the exemplary embodiments described above with reference to FIGS. 21 through 27.

While the exemplary embodiments have been particularly shown and described with reference to certain exemplary embodiments thereof, it will be understood by those of ordinary skill in the art that various changes in form and details may be made therein without departing from the spirit and scope according to the exemplary embodiments as defined by the following claims.

The invention claimed is:

1. A video stream decoding method comprising:
   obtaining random access point (RAP) reference layer number information indicating a number of layers referred to for performing inter layer prediction on RAP images among current layer images and non-RAP reference layer number information indicating a number of different layers referred to for performing inter layer prediction on non-RAP images, from a video stream comprising images encoded for a plurality of layers;
   obtaining RAP reference layer identification information for a layer referred to for predicting the RAP images based on the obtained RAP reference layer number information, from the video stream;
   obtaining non-RAP reference layer identification information for a layer referred to for predicting the non-RAP images based on the obtained non-RAP reference layer number information, from the video stream;
   reconstructing a RAP image of a current layer based on a layer image indicated by the obtained RAP reference layer identification information; and
   reconstructing a non-RAP image of the current layer based on a layer image indicated by the obtained non-RAP reference layer identification information.

2. The video stream decoding method of claim 1, wherein, when the current layer is a base layer, the RAP reference layer number information, the non-RAP reference layer number information, the RAP reference layer identification information, and the non-RAP reference layer identification information are obtained from the video stream for the plurality of layers.

3. The video stream encoding method of claim 1, wherein the RAP image is one of a clean random access (CRA) image, a broken link access (BLA) image, and an instantaneous decoding refresh (IDR) image.

4. The video stream decoding method of claim 1, further comprising:
   obtaining multiple standard use information indicating whether two or more encoding standard methods are used for the plurality of layers, from the video stream.

5. The video stream decoding method of claim 4, wherein the obtaining of the multiple standard use information comprises:
   when the plurality of layers respectively correspond to views of a multi-view video, obtaining information regarding a profile and a level of a predetermined standard method that is an encoding method of images of a predetermined layer from among a base view layer and additional view layers of the multi-view video; and
   reconstructing the images of the predetermined layer based on the obtained information regarding the profile and the level of the predetermined standard method.

6. The video stream decoding method of claim 1, wherein the RAP reference layer number information, the non-RAP reference layer number information, the RAP reference layer identification information, and the non-RAP reference layer identification information are obtained from a video parameter set (VPS) extension area included in a raw bytes sequence payload (RBSP) of high efficiency video coding (HEVC) network abstract layer (NAL) units, from the video stream comprising the HEVC NAL units.

7. A video stream encoding method comprising:
   encoding random access point (RAP) images from among current layer images by referring to a different layer image for a plurality of layers;
   encoding non-RAP images from among the current layer images by referring to a different layer image for the plurality of layers; and
   generating a bitstream comprising RAP reference layer number information indicating a number of layers referred to for performing inter layer prediction on the RAP images, non-RAP reference layer number information indicating a number of different layers referred to for performing inter layer prediction on the non-RAP images, RAP reference layer identification information for a layer referred to for predicting the RAP images, and non-RAP reference layer identification information for a layer referred to for predicting the non-RAP images, for the plurality of layers.

8. The video stream encoding method of claim 7, wherein, when the current layer is a base layer, the RAP reference layer number information, the non-RAP reference layer number information, the RAP reference layer identification information, and the non-RAP reference layer identification information are obtained from a video stream for the plurality of layers.

9. The video stream encoding method of claim 7, wherein the RAP image is one of a clean random access (CRA) image, a broken link access (BLA) image, and an instantaneous decoding refresh (IDR) image.

10. The video stream encoding method of claim 7, wherein the generating of the bitstream comprises: including multiple standard use information indicating whether two or more encoding standard methods are used for the plurality of layers in the bitstream.

11. The video stream encoding method of claim 10, wherein, when the plurality of layers respectively correspond to views of a multi-view video, the multiple standard use information comprises information regarding a profile and a level of a predetermined standardized encoding method that is an encoding method of images of a predetermined layer among a base view layer and additional view layers of the multi-view video, based on the multiple standard use information, and wherein the images of the predetermined layer are encoded based on the information regarding the profile and the level of the predetermined standard method.

12. The video stream encoding method of claim 7, wherein the generating of the bitstream comprises: recording the RAP reference layer number information, the non-RAP reference layer number information, the RAP reference layer identification information, and the non-RAP reference layer identification information in a video parameter set (VPS) extension area included in a raw bytes sequence payload (RBSP) of high efficiency video coding (HEVC) network abstract layer (NAL) units.

13. A video stream decoding apparatus comprising:

a bitstream parser configured to obtain random access point (RAP) reference layer number information indicating a number of layers referred to for performing inter layer prediction on RAP images among current layer images and non-RAP reference layer number information indicating a number of different layers referred to for performing inter layer prediction on non-RAP images, RAP reference layer identification information for a layer referred to for predicting the RAP images based on the obtained RAP reference layer number information, and non-RAP reference layer identification information for a layer referred to for predicting the non-RAP images based on the obtained non-RAP reference layer number information, from a video stream comprising images encoded for a plurality of layers; and an inter layer decoder configured to reconstruct a RAP image of a current layer based on a layer image indicated by the obtained RAP reference layer identification information, and reconstruct a non-RAP image of the current layer based on a layer image indicated by the obtained non-RAP reference layer identification information.

14. A video stream encoding apparatus comprising:

a base view image restorer configured to restore base view images comprising base view anchor pictures that are I-picture type images by performing motion compensation referring to the base view images by using a received base view image stream;

a first additional view image restorer configured to restore images of a first additional view by performing at least one of disparity compensation referring to the restored base view images and motion compensation referring to images except for an anchor picture having a preceding reproduction order among the images of the first additional view by using an image stream of the first additional view from among received additional view image streams; and a view switcher configured to, if view switching occurs during restoration of the images of the first additional view, restore images of a second additional view by performing at least one of disparity compensation referring to the restored base view images and motion compensation referring to images except for an anchor picture having a preceding reproduction order among the images of the second additional view based on an anchor picture of the second additional view of a view switching point by using an image stream of the second additional view.

15. A non-transitory computer readable recording medium having recorded thereon a program for executing the method of claim 1.

* * * * *